(12) United States Patent
Wills

(10) Patent No.: US 7,776,218 B2
(45) Date of Patent: *Aug. 17, 2010

(54) SYSTEM FOR LIQUID EXTRACTION, AND METHODS

(75) Inventor: Robert A. Wills, Brooklyn Park, MN (US)

(73) Assignee: KFI Intellectual Properties L.L.C., St. Paul, MN (US)

( * ) Notice: Subject to any disclaimer, the term of this patent is extended or adjusted under 35 U.S.C. 154(b) by 1149 days.

This patent is subject to a terminal disclaimer.

(21) Appl. No.: 11/247,949

(22) Filed: Oct. 11, 2005

(65) Prior Publication Data
US 2006/0086664 A1 Apr. 27, 2006

Related U.S. Application Data

(63) Continuation-in-part of application No. 10/538,557, filed on Jan. 6, 2006.

(51) Int. Cl.
B01D 11/00 (2006.01)
C12C 11/11 (2006.01)

(52) U.S. Cl. .......................... 210/634; 44/302; 134/10; 210/639; 210/770; 210/774; 210/806; 34/340; 34/342; 435/132; 435/161; 426/11; 426/429

(58) Field of Classification Search .................. 34/337, 34/340, 342; 134/10, 12, 26; 210/634, 638, 210/770, 774, 806, 639; 426/11, 425, 429, 426/430; 435/132, 161; 44/302, 307
See application file for complete search history.

(56) References Cited

U.S. PATENT DOCUMENTS

| | | | |
|---|---|---|---|
| 3,152,150 A * | 10/1964 | Lockwood et al. | 549/345 |
| 3,629,150 A * | 12/1971 | Addy et al | 502/231 |
| 3,661,535 A | 5/1972 | Somerville | |
| 3,794,712 A * | 2/1974 | Aboutboul et al | 423/338 |
| 3,843,515 A | 10/1974 | MacDonald et al. | |
| 4,014,104 A | 3/1977 | Murphy | |
| 4,116,712 A | 9/1978 | Othmer | |

(Continued)

FOREIGN PATENT DOCUMENTS

WO    WO 92/22367    12/1992

(Continued)

OTHER PUBLICATIONS

Supplemental European Search Report dated Aug. 20, 2007.

Primary Examiner—Joseph W Drodge
(74) Attorney, Agent, or Firm—Merchant & Gould P.C.

(57) ABSTRACT

A process for removing water from solid material using liquid-solid extraction and liquid-liquid extraction. In most embodiments, multiple solvents are used to remove the water from the solids and obtain dry solids. Multiple solvents facilitate the removal of the water from the solids, by replacing the water with a solvent, replacing that solvent with a different solvent, and then eventually removing the second solvent from the solids. The process utilizes a lesser amount of thermal energy to dry the solids and separate the solvents than conventionally used in drying processes. The first solvent selected has a lower heat of vaporization, enthalpy of vaporization, boiling point, or other such physical property, than water. Each additional solvent can have a still lower heat of vaporization, enthalpy of vaporization, boiling point, or other such physical property.

12 Claims, 11 Drawing Sheets

U.S. PATENT DOCUMENTS

| | | | |
|---|---|---|---|
| 4,217,178 A | 8/1980 | Katzan et al. | |
| 4,251,231 A | 2/1981 | Baird | |
| 4,278,443 A | 7/1981 | Beuther et al. | |
| 4,339,882 A | 7/1982 | Dickey et al. | |
| 4,749,495 A | 6/1988 | Schmidt et al. | |
| 5,340,446 A | 8/1994 | Nelson et al. | |
| 5,478,443 A | 12/1995 | Cogat | |
| 5,585,002 A | 12/1996 | Nardella et al. | |
| 5,630,911 A | 5/1997 | Kratochwill | |
| 5,727,689 A | 3/1998 | Anderson et al. | |
| 5,756,098 A | 5/1998 | Price et al. | |
| 6,017,505 A | 1/2000 | Ziegler et al. | |
| 6,166,231 A | 12/2000 | Hoeksema | |
| 6,224,847 B1 | 5/2001 | Powell et al. | |
| 6,242,595 B1 | 6/2001 | Keunecke | |
| 6,262,285 B1 | 7/2001 | McDonald | |
| 6,279,250 B1 | 8/2001 | Anderson | |
| 6,438,867 B1 | 8/2002 | Teich et al. | |
| 6,455,087 B1 | 9/2002 | Nicola | |
| 6,509,051 B1 | 1/2003 | Wills | |
| 6,509,180 B1 * | 1/2003 | Verser et al. | 435/161 |
| 6,516,537 B1 | 2/2003 | Teich et al. | |
| 6,517,875 B1 * | 2/2003 | Kado et al. | 426/29 |
| 6,743,300 B2 * | 6/2004 | Gray | 134/12 |
| 6,818,239 B2 | 11/2004 | Kagan et al. | |
| 6,916,630 B2 | 7/2005 | Sofer | |
| 7,053,036 B2 * | 5/2006 | DeGroot et al. | 510/410 |

FOREIGN PATENT DOCUMENTS

| | | |
|---|---|---|
| WO | WO 98/17593 | 4/1998 |
| WO | WO 2004/057255 | 7/2004 |

* cited by examiner

SYSTEM FOR LIQUID EXTRACTION, AND METHODS

This application is a continuation-in-part of co-pending U.S. application Ser. No. 10/538,557, filed Jan. 6, 2006. The entire disclosure of application Ser. No. 10/538,557 is incorporated herein by reference.

FIELD OF THE INVENTION

The invention is directed to a system, and its methods of use, for extracting liquid water and/or a hydrocarbon from a feed stream using at least two solvents. The system and method can generally be described as a reduced energy extraction and drying processes.

BACKGROUND OF THE INVENTION

For many processes, an exiting stream, whether considered a waste stream, a by-product, or the main desired stream, is composed of a solid material wet with water. This water is typically found in both the interstitial spaces of the solid and is absorbed or adsorbed by the solid. Water such as this has typically been removed by drying the solids with thermal energy. This process generally requires a large amount of heat or energy to remove the water from the solids and obtain dry, usable solids.

Attempts have been made to use organic solvents to remove water from wet solids using solvents such as hexane. Essentially, the hexane is used to displace the water from the solids. The hexane remaining with the solids is then evaporated from the solids with thermal energy. Again, this process generally requires a large amount of thermal energy, but less than if water alone was being dried from the solids. However hexane also brings with it certain other concerns, such as toxicity. Further, because of poor displacement, large amounts of residual water may remain with the solids.

Some examples of known extraction methods include Baird, U.S. Pat. No. 4,251,231, which utilizes liquid-liquid extraction to directly extract alcohol suitable for use in gasohol from a fermentation mixture. Gasoline was used as the extraction solvent. The water was removed by either the use of adsorbents or absorbents, or by chilling the extracted alcohol-gasoline product to a temperature below about $-10°$ F., thereby removing the water.

During the ethanol manufacturing process, solids, wet with primarily water and some ethanol, exit the fermentation process as a beer stream. Other materials, such as oils and glycerol are also present in the beer stream. It is desired to obtain individual output streams of dry solids, water, and ethanol.

The beer stream solids, as discussed above, have the water in both the interstitial spaces of the solid and that which is absorbed or adsorbed by the solid. This water, and any ethanol, has typically been removed by drying the solids with thermal energy. Preferably, the ethanol is recovered and is used; unfortunately, recovery of pure, or fairly pure ethanol, is not usual. Additionally, preferably the water is sufficiently pure that the water can be readily disposed; unfortunately, the water has contaminants that inhibit direct, unmanaged disposal. Still further, contaminants, such as oils and glycerol, remain in the solids, making them undesirable for many applications.

What is needed is a low cost, more heat or energy efficient process for drying solids wet with water. It would be beneficial if the various output streams from the process could be reclaimed and used.

SUMMARY OF THE INVENTION

The invention is a process for separating water from solids and from other hydrocarbons that may be present, the process utilizing at least 20% less energy than conventional forced air drying of the same material.

Solids, wetted with water, are separated from the water and dried by the inventive process. The process removes the water residing in the interstitial spaces of the solids, as well as some of the water that has been absorbed by the solids. The process uses a liquid-solid extraction process to remove the water from the solid feed stream.

In one embodiment, multiple solvents are used to step-wise remove the water from the solids and obtain dry solids. The multiple solvents facilitate the removal of the water from the solids, by step-wise replacing the water with a solvent, replacing that solvent with a further solvent, and then eventually removing the further solvent from the solids.

In another embodiment, multiple solvents are combined and used in single step to remove the water from the solids and obtain dry solids. The combined multiple solvents facilitate the removal of the water from the solids, by replacing the water with one of the solvents, replacing that solvent with a further solvent, and then eventually removing the further solvent from the solids. In this embodiment, the two (or more) solvents are introduced to the solids concurrently or simultaneously, preferably mixed together.

Use of multiple solvents, whether applied sequentially or concurrently, facilitates the separation of the water from the solids, the solvents from the water, and the various solvents from each other. The multiple solvents are separated from each other by liquid-liquid extraction or distillation processes.

Multiple solvents utilize less thermal energy to dry the solids and separate the solvents than conventionally used in drying processes. At least one solvent selected has a lower heat of vaporization, enthalpy of vaporization, boiling point, or other such physical property, than water. Each additional solvent has a lower heat of vaporization, enthalpy of vaporization, boiling point, or other such physical property than the first solvent used. These general properties apply whether the solvents are used sequentially (e.g., step-wise) or concurrently (e.g., mixed together).

In a further embodiment, the invention is directed to a process for drying solids initially wet with water. The process includes contacting a feed stream comprising solids having interstitial spaces, and water present in the interstitial spaces, with a solvent. This solvent may be a combination of two or more solvents. The water present in the interstitial spaces is displaced by the solvent, leaving the solvent in the interstitial spaces. The feed stream having the solvent in the interstitial spaces can then be contacted with a second solvent; and the first solvent present in the interstitial spaces is displaced by the second solvent, thus providing the second solvent in the interstitial spaces.

DETAILED DESCRIPTION OF THE PREFERRED EMBODIMENT

As provided above, the invention is directed to processes for separating water from solids by utilizing at least two solvents. The at least two solvents can be applied to the solids either sequentially or step-wise (i.e., one after the other), or mixed together.

The process uses a first solvent to displace the water from the interstitial spaces in the solids. This first solvent, having a lower heat of vaporization and boiling point than the water, is easier to remove from the solids than water. A second solvent is used to displace the first solvent from the solids. The second solvent has a lower heat of vaporization and boiling point than the first solvent. The second solvent can be introduced to the solids subsequent to introducing the first solvent, or concurrent with the first solvent.

The first solvent is preferably soluble in water but does not form an azeotropic mixture with water. An azeotropic mixture is a mixture of two or more substances that behaves like a single substance. The vapor produced by partial evaporation of the liquid has the same composition as the liquid; that is, vaporization of the mixture does not result in separation of the initial substances.

The second solvent is preferably soluble with the first solvent but insoluble with water. Depending on the solvents used and their ratios, the first and second solvents may or may not form an azeotropic mixture. The second solvent may, however, be miscible with the first solvent, and/or with water.

Any additional or subsequent solvent(s) can be soluble with the predecessor solvent, and may or may not form an azeotropic mixture with the other solvents.

By utilizing this multiple solvent, liquid-extraction process, the energy needed to dry the solids and separate the various solvents from each other and from water is greatly reduced compared to conventional processes.

The processes of the invention can generally be reduced to an initial extraction subprocess that removes water from the solids followed by two subprocesses, a 'solvent-from-solids' separation subprocess which separates solvent from the solids, and a 'water-from-solvents' separation subprocess that separates and reclaims the water and solvents, and optionally, other components.

Figure 1:
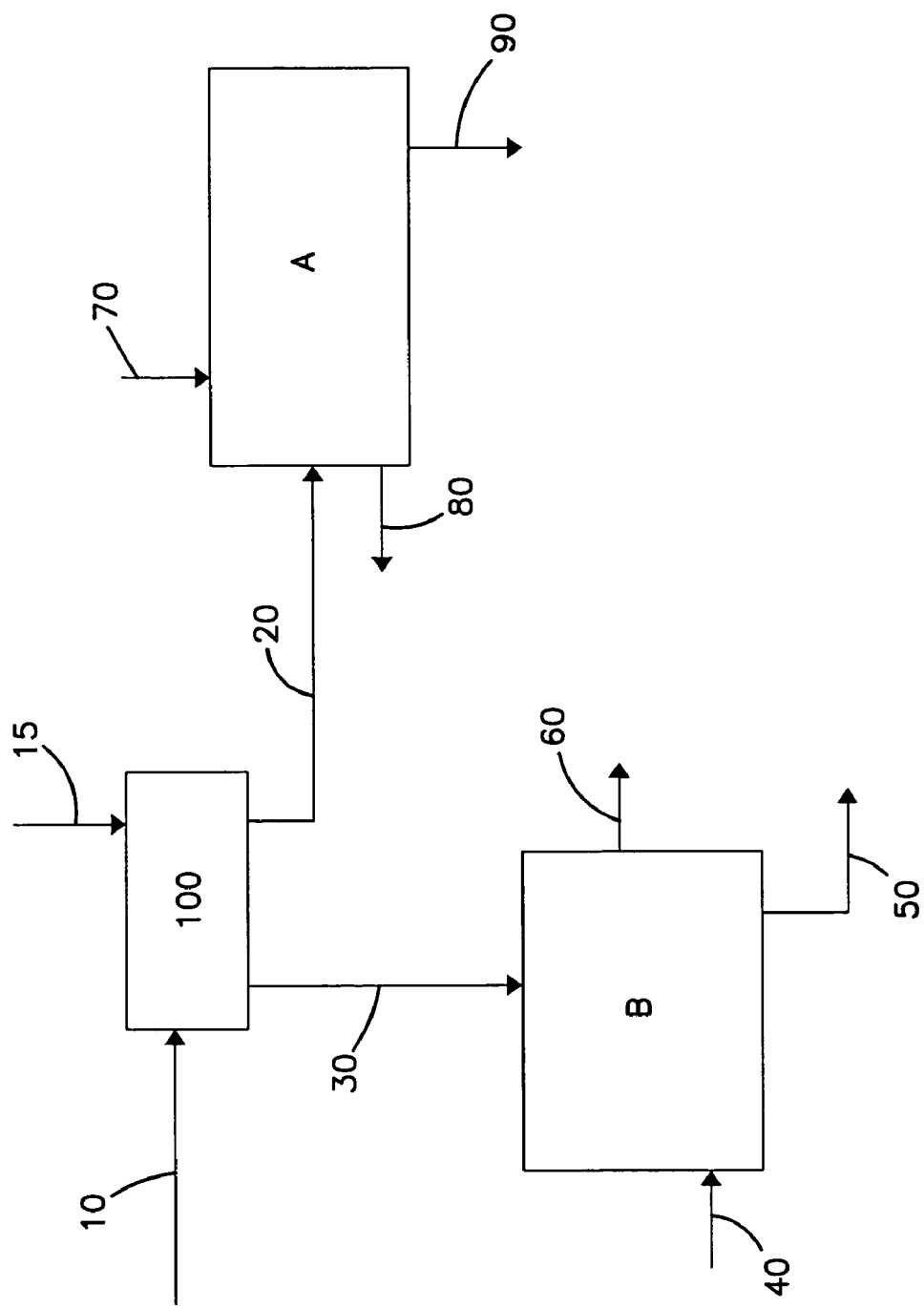
FIG. 1 is a schematic diagram of a general process according to the present invention, having an 'initial' separation subprocess, a 'solvent-from-solids' separation subprocess and a 'water-from-solvents' separation subprocess.

Referring now to the figures, a diagrammatic rendering of a process according to the present invention, using two sequentially applied solvents, is generally depicted in FIG. 1.

This process has an initial separation process 100 to separate water from the solids and two general subprocesses, one for removing solvent from solids, subprocess A, and a second for separating and reclaiming water and solvents, subprocess B.

Feed stream 10, an aqueous stream with solids therein, is illustrated entering the system at the top left corner of FIG. 1. The type and amount of solids in stream 10 will vary. The specific solids present will depend on the source, and example sources include grains, other plant materials and earthen materials.

The amount of solids in stream 10 is generally 5 to 50% by weight. A common amount of solids in stream 10 is about 10-12%. As mentioned, steam 10 is typically an aqueous stream, with the water present at a level of about generally 50 to 95% by weight. A common amount of water in stream 10 is about 78 wt-%. Other liquids, in addition to the water, can be and are often present in feed stream 10.

If feed stream 10 is from a fermentation process, stream 10 generally includes alcohol (such as ethanol). The level of alcohol and other components in stream 10 is dependent on the efficiency of the process providing stream 10, however, the alcohol in stream 10 is generally less than 16 wt-%. Usually, the level of alcohol in stream 10 is greater than about 8 wt-%. A common level of alcohol in some streams is about 15 wt-%.

Other materials are typically present in stream 10. For example, oil (such as corn oil) and glycerol are usually present. Examples of solutes that may be present include acids (such as acetic acid), aldehydes (such as acetaldehyde), and various sugars. The levels of these material are low, typically less than 2 wt-% and often less than 1 wt-% of stream 10.

Returning to FIG. 1, feed stream 10 is fed into a water/solid extraction system 100 where the solids of feed stream 10 are separated from water. An alternate descriptive term for water/solid extraction system 100 is a water extractor or a solid-liquid extraction unit. Extraction system 100 is configured to remove water from feed stream 10 and replace the water with a solvent. Additional details regarding a preferred extraction system 100 are provided below.

Extraction system 100 transfers one or more components from feed stream 10 into the extraction solvent stream (described below). Typically, extraction system 100 operates in a counter-current arrangement; that is, the extraction solvent stream enters system 100 farthest from where feed stream 10 enters, and the two streams contact and pass counter-currently to each other.

In addition to feed stream 10 being fed into extraction system 100, an extraction solvent stream 15 is fed into system 100. It is the solvent in stream 15 that will extract and replace the water from feed stream 10. First solvent from stream 15 combines with or displaces the original aqueous liquids from feed stream 10 as feed stream 10 and solvent stream 15 pass in system 100.

This exchange of one solvent for another in a stream is due to concentration equilibrium. Solvent, present at a high concentration in stream 15, moves to a stream having a lower concentration, i.e., stream 10; likewise, water, present at a high concentration in stream 10, moves to a stream with a lower concentration of water, i.e., stream 15.

The solvent is selected for stream 15 based on a lower heat of vaporization or enthalpy of vaporization than the water in feed stream 10. Water has a heat of vaporization of 1000 BTU per pound of water, thus, solvent of stream 15 should have a heat of vaporization less than 1000. The lower the heat of vaporization in relation to 1000 BTU, the easier the subsequent separation of solvent 15 from water. The solvent of stream 15 can be water soluble. The solvent of stream 15 and water may or may not form an azeotropic mixture. If an azeotrope is not formed, subsequent separation of the solvent and water is simple.

Although virtually any water soluble solvent can be selected for extraction solvent stream 15, it is preferred to select one which may already be present in feed stream 10. Examples of suitable solvents include alcohols (such as ethanol, methanol, isopropyl alcohol, and gasohol) and ketones (such as acetone, methyl ethyl ketone (MEK), methyl isobutyl ketone (MIBK)), and mixtures thereof. If feed stream 10 is primarily composed of solids, water and alcohol, as it is from many fermentation processes, solvent stream 15 is preferably an alcohol, for example, the alcohol that is present in feed stream 10.

As stated above, water in feed stream 10 is replaced with first solvent from stream 15 by water extraction system 100. The resulting output streams from system 100 are solids stream 20 and liquid stream 30.

Solid stream 20 is a wet solids stream, composed of the solids from stream 10 and an amount of first solvent from stream 15. Wet solids stream 20 progresses to and is treated by subprocess A, as will be described below. Liquid stream 30 is generally composed of the original liquid from feed stream 10 (that is, the water and any other liquid, such as an alcohol) and the solvent from solvent stream 15. Liquid stream 30 progresses to and is treated by subprocess B, described below.

Extraction System 100

Figure 2:
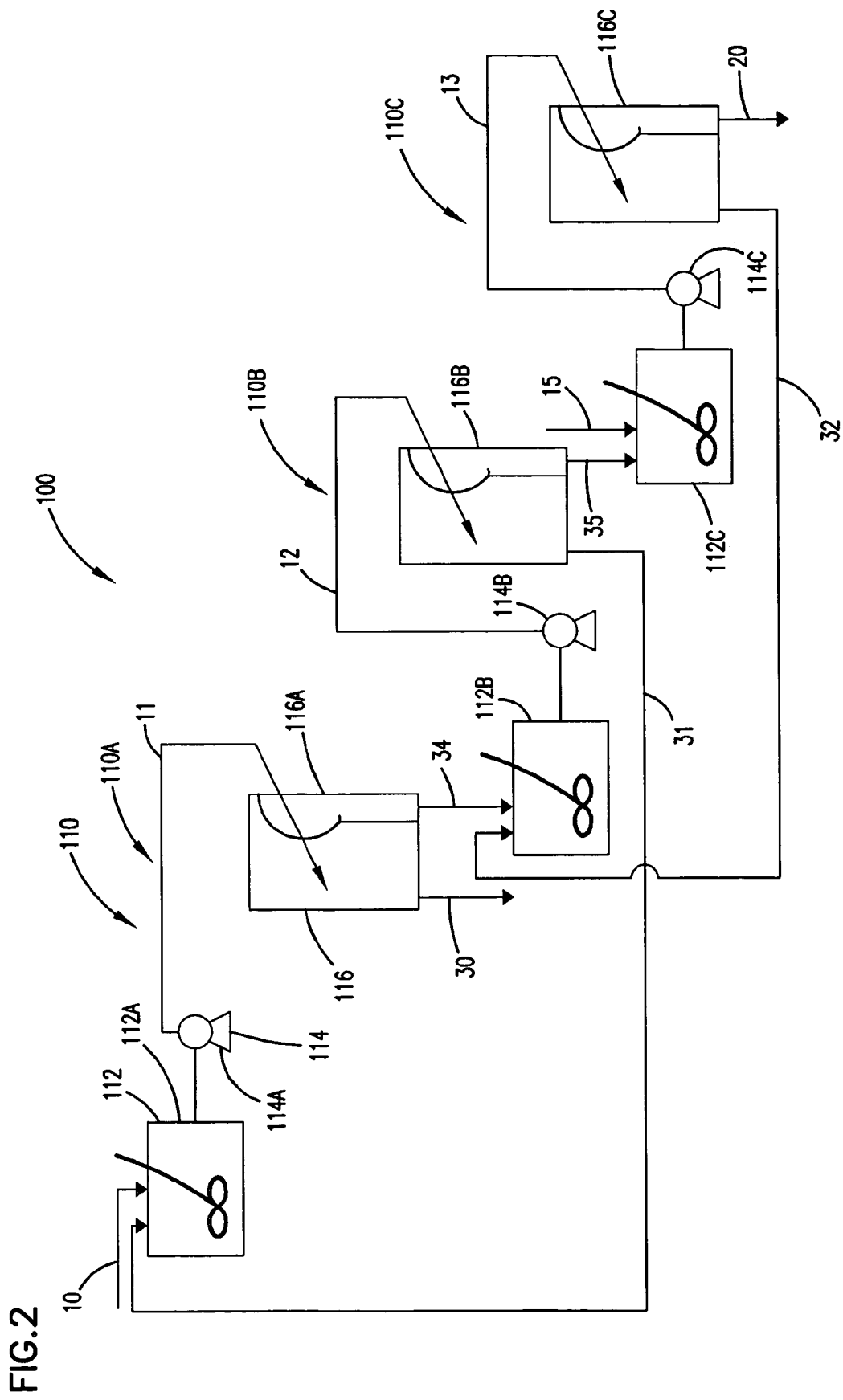
FIG. 2 is a schematic process diagram of a general, first embodiment of the 'introductory' separation subprocess according to the present invention.

A preferred configuration for a water-solid extraction system 100 is illustrated in FIG. 2. As seen in FIG. 1 and in FIG. 2, feed stream 10 and solvent stream 15 enter system 100, and wet solids stream 20 and liquid stream 30 exit system 100.

Water-solid extraction system 100 has at least one extraction unit 110. In the system 100 illustrated in FIG. 2, system 100 has three extraction units, specifically, 110A, 110B, 110C. Each extraction unit 110 includes a mixing tank 112, a pump 114, mechanical separator 116, and the piping to operably connect the elements.

Mixing tank 112 can be any suitable receptacle for combining and temporarily storing solid and liquid materials. In the embodiment illustrated, tank 112 accepts beer feed 10 and water/solvent stream 31, which will be described below. Examples of suitable materials for tank 112 include steels, such as carbon steel and stainless steels. A preferred material is 304 stainless steel. The volume of tank 112 is based on the material flow volumes and desired residence time in tank 112. A 30 gallon tank is a suitable size for some processes.

Pump 114, used to move material from tank 112, is positioned downstream of tank 112. Pump 114 is selected for its ability to move the material from tank 112, which includes solid material and liquid, to mechanical separator 116. Examples of suitable pumps include diaphragm pumps, centrifugal pumps, and pumps designed to pump a combination of liquid and solids. An example of a preferred pump 114 is a centrifugal pump available from Goulds Pumps of ITT Industries.

Mechanical separator 116 separates solid material from liquid. Examples of suitable mechanism separating equipment include Rotocel extractors, double screw extractors, baskets, rotary perforated belts, sliding rolls, and loop extractors; this equipment is well known for solid/liquid extraction processes. The specific equipment used will be dependent on the solvents used in the process and in the solvent ratios. Preferred equipment for use in extraction system 100 is a stationary screen, described below.

The piping connecting tank 112, pump 114, and mechanical separator 116, for each extraction unit 110, is selected for its ability to move the solid-liquid material. An example of preferred piping is 1 inch carbon steel piping.

Figure 3A:
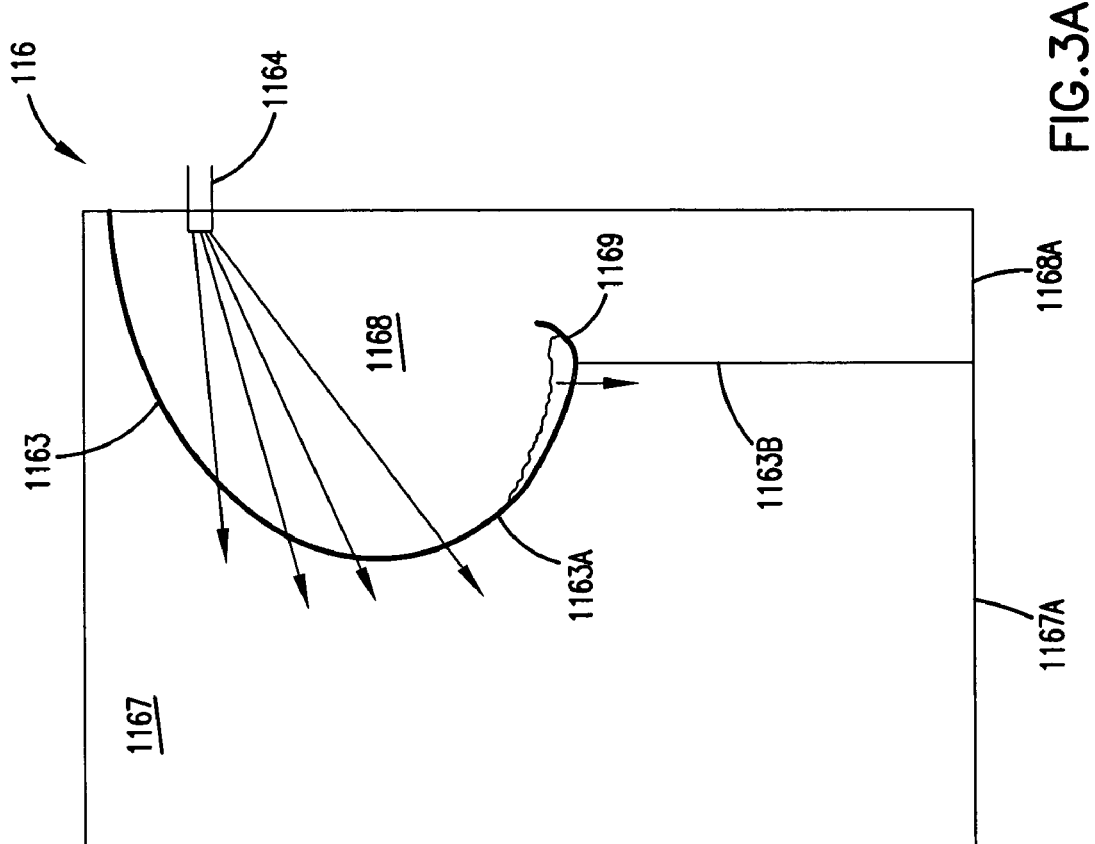
FIG. 3A is a schematic diagram of an extraction unit of the subprocess of FIG. 2.

A preferred configuration for a screen mechanical separator 116 is illustrated in FIG. 3A. Separator 116 has a housing 1162 in which is a screen 1163. Screen 1163 has a first, curved portion 1163A and a second, generally vertical portion 1163B. Screen 1163 separates housing 1162 into a filtrate side 1167 and a cake side 1168.

A nozzle 1164 is present to spray wet solids stream 11, from tank 112, onto screen 1163. In one preferred process configuration, nozzle 1164 is configured to provide a flow of 8-10 gallons/minute of wet solids stream 11 onto screen 1163.

Figure 3B:
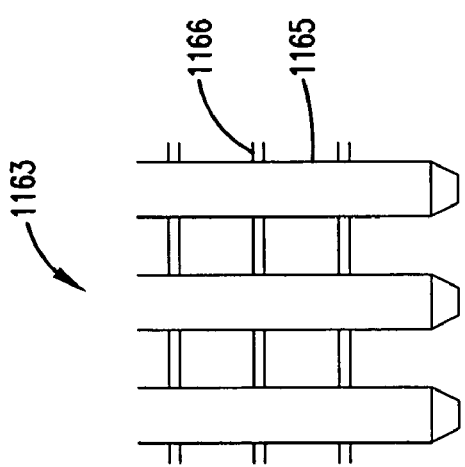
FIG. 3B is an enlarged, perspective view of a portion of the extraction unit of FIG. 3A.

An enlargement of screen 1163 is illustrated in FIG. 3B. Screen 1163 has a plurality of separating members 1165 secured by cross-members 1166, both of which can be carbon steel or stainless steel. Separating members 1165, positioned closer to nozzle 1164, on cake side 1168, preferably extend vertically, to facilitate solids running down members 1165. In one preferred process, members 1165 and 1166 are arranged to provide a mesh size (i.e., an opening) of at least 0.01 inch.

Wet solids stream 11, sprayed by nozzle 1164 primarily onto curved portion 1163A, is separated by members 1165 and 1166. Liquid from stream 11 passes through screen 1163 and is collected on filtrate side 1167. The solids, too large to pass through screen 1163, remain on cake side 1168.

It is understood that some liquid will not pass through screen 1163 but will remain with the solids. Screen 1163 may have a dam or baffle 1169 positioned at or near the juncture of curved portion 1163A and vertical portion 1163B, to retain solids in an attempt to have liquid drop therefrom.

The liquid, having passed through screen 1163 to filtrate side 1167, would be removed from housing 1162 via an outlet 1167A. The wet solids, left on cake side 1168, would be removed from housing 1162 via an outlet 1168A.

Returning to FIG. 2, this illustrated process has three extraction units 110A, 110B, 110C. Unit 110A has mixing tank 112A, pump 114A, mechanical separator 116A, and the piping to operably connect the elements. Unit 110B has mixing tank 112B, pump 114B, mechanical separator 116B, and the piping to operably connect the elements. Unit 110C has mixing tank 112C, pump 114C, mechanical separator 116C, and the piping to operably connect the elements.

Beer feed 10 is fed into tank 112A where it is mixed with water/solvent stream 31 (described later). This mixture, as stream 11, is pumped via pump 114A to mechanical separator 116A, where it is split into water/solvent stream 30 and wet solids stream 34.

Wet solids stream 34 is fed into tank 112B where it is mixed with water/solvent stream 32 (described later). This mixture, as stream 12, is pumped via pump 114B to mechanical separator 116B, where it is split into water/solvent stream 31 and wet solids stream 35.

Wet solids stream 35 is fed into tank 112C where it is mixed with first solvent stream 15. This mixture, as stream 13, is pumped via pump 114C to mechanical separator 116C, where it is split into water/solvent stream 32 and wet solids stream 20.

Stream 30, from unit 110A, is referred to as a "full miscella". In the embodiment illustrated in FIG. 2, because there are three units, each stream is allotted a third (i.e., 1/3) designation. Stream 31, from unit 110B, is referred to as a "2/3 miscella" and stream 32, from unit 110C, is referred to as a "1/3 miscella". Full miscella stream 30 has a lower solvent concentration and a higher water concentration than 2/3 miscella stream 31, which has a lower solvent concentration and a higher water concentration than ⅓ miscella stream 32.

Each of these streams 30, 31, 32 is reused in the process. Stream 31 is recycled and fed into tank 112A, and stream 32 is recycled and fed into tank 112B. Full miscella stream 30, composed of water from beer feed 10 and first solvent from stream 15, is used in 'water-from-solvents' separation subprocess B. Wet solids stream 20, composed of solids and first solvent from stream 15, progresses to 'solvent-from-solids' separation subprocess A.

'Solvent-from-Solids' Separation Subprocess A

Returning to FIG. 1, from water extraction system 100, wet solids stream 20 is conveyed to 'solvent-from-solids' separation subprocess A. In subprocess A, solvent from wet solids stream 20 is removed, by using a second solvent, to obtain dry solid stream 90. Second solvent is introduced to subprocess A as stream 70. First solvent (originally from stream 15) and second solvent from stream 70 depart subprocess A as stream 80/230.

In subprocess A, the first solvent from stream 15, such as an alcohol, is extracted from the solids and replaced with a second solvent. The second solvent is removed from the solids and dry solids are obtained. 'Solvent-from-solids' separation subprocess A is generally configured as two sub-subprocess, solvent extraction and thermal drying.

Figure 4:
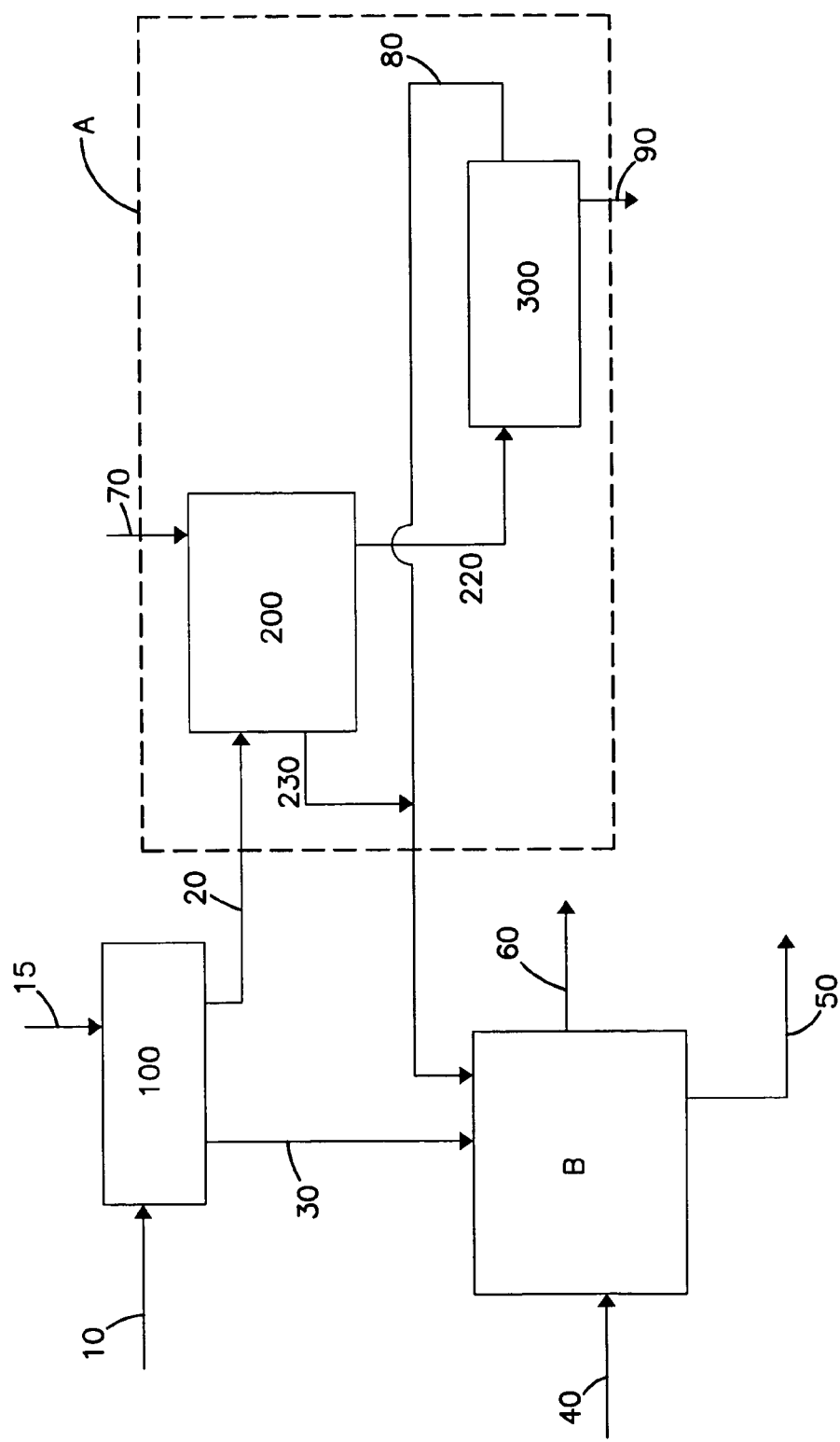
FIG. 4 is a schematic process diagram of a first embodiment of the 'solvent-from-solids' separation subprocess according to the present invention.

Referring to FIG. 4, 'solvent-from-solids' separation subprocess A is illustrated having solvent extraction system 200 and drying system 300. An alternate descriptive term for solvent extraction system 200 is a solvent extractor or a solid-liquid or solid-solvent extraction unit. Solvent extraction system 200 is configured to remove the first solvent from wet solids stream 20 and replace the first solvent with a second solvent.

Solvent extraction system 200 transfers one or more components from wet solids stream 20 into the extraction second solvent stream (described below). Typically, solvent extraction system 200 operates in a counter-current arrangement.

In addition to wet solids stream 20 being fed into extraction system 200, an extraction second solvent stream 70 is fed into system 200. It is the solvent in stream 70 that will extract and replace the solvent from wet solids 20. Second solvent from stream 70 combines with or displaces the first solvent from feed stream 15 in solids stream 20 as stream 20 and solvent stream 70 pass in system 200.

The second solvent is selected for stream 70 based on a lower heat of vaporization or enthalpy of vaporization than the first solvent of stream 15, which is present in wet solids stream 20. Preferably, the solvent of stream 70 is soluble with and miscible with the first solvent of stream 15. The solvent of stream 70 and the solvent of stream 15 may or may not form an azeotropic mixture; if an azeotrope is not formed, subsequent separation of the solvents is more simple.

Examples of suitable solvents for stream 70 include ethers, (such as ethyl ether, MTBE (methyl tert-butyl ether), ETBE (ethyl tert-butyl ether), fluorinated ethers, and other low molecular weight ethers), halogenated hydrocarbons (e.g., n-propyl bromide or 1-bromopropane, commercially available under the trade name "Hypersolve NPB"), straight chain low molecular hydrocarbons (such as hexane, pentane), and low molecular weight aromatic hydrocarbons (such as toluene, benzenes, xylenes), and any mixtures thereof.

The second solvent is selected on the basis of high solubility with the first solvent (e.g., ethanol), low solubility with water, and ease of separation between the first and second solvents, generally based on differential of heat of vaporization or enthalpy of vaporization.

Stream 70 may be provided by an external source, but is preferably recycled from the solvent removed from the solids, and from overhead stream 70 from still 700, as will be discussed below.

As stated above, first solvent from stream 15, now present in wet solids stream 20, is replaced with second solvent from stream 70 by solvent extraction system 200. The resulting output streams from system 200 are wet solids stream 220 and liquid stream 230; see FIG. 4. Solid stream 220 is composed of the solids and an amount of second solvent from stream 70. Wet solids stream 220 progresses to drying system 300, where the second solvent is removed from the solid.

Liquid stream 230 is generally composed of the solvent from solvent stream 15 and second solvent from stream 70. Liquid stream 230 progresses to and is treated by subprocess B, described below.

Solvent Extraction System 200

Figure 5:
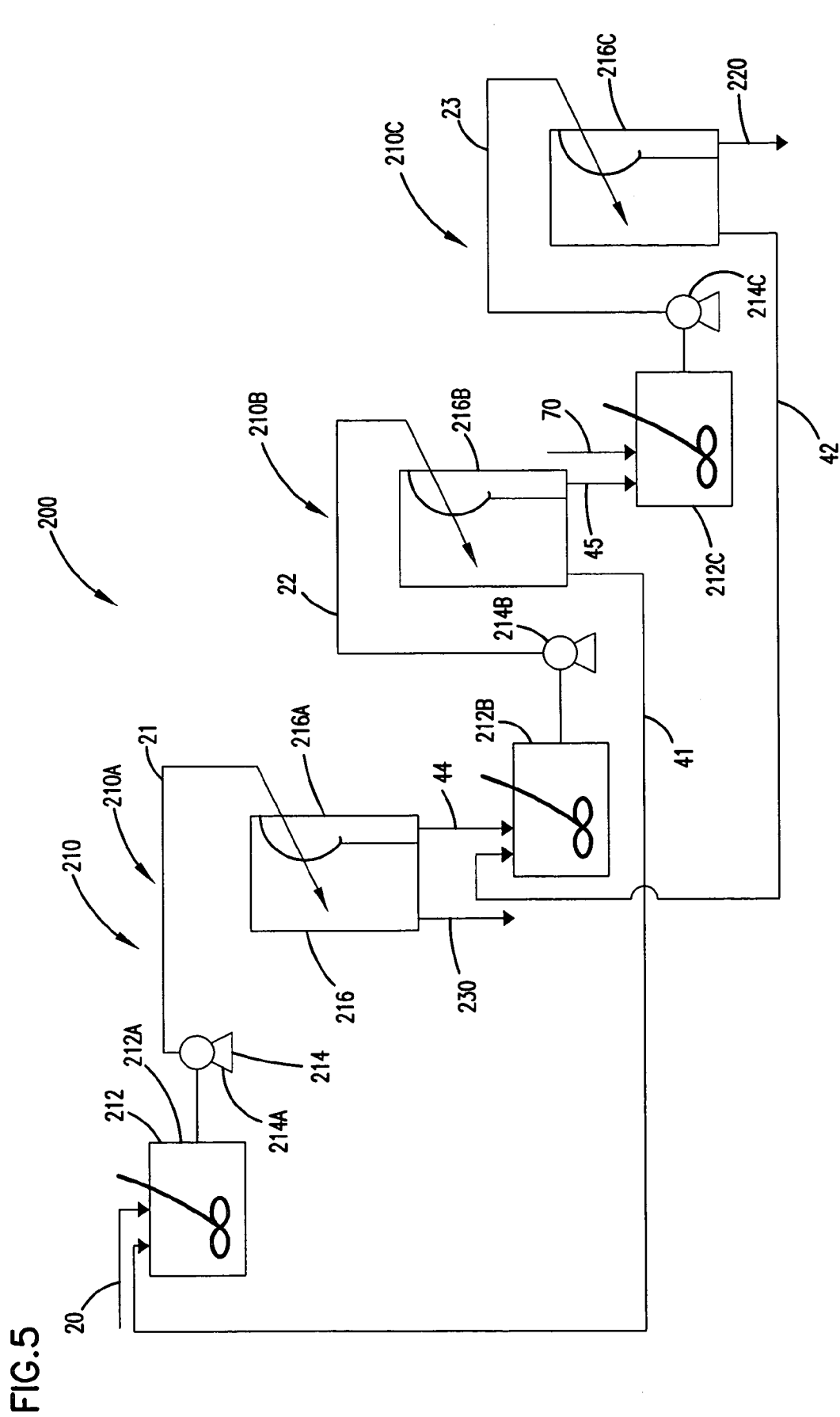
FIG. 5 is a schematic process diagram of a portion of the 'solvent-from-solids' separation subprocess of FIG. 4.

A preferred configuration for a solvent-solid extraction system 200 is illustrated in FIG. 5. As seen in FIG. 4 and in FIG. 5, wet solids stream 20 and second solvent stream 70 enter system 200, and wet solids stream 220 and liquid stream 230 exit system 200.

Solvent-solid extraction system 200 has at least one extraction unit 210. In the system 200 illustrated in FIG. 5, system 210 has three extraction units, specifically, 210A, 210B, 210C. Each extraction unit 210 includes a mixing tank 212, a pump 214, mechanical separator 216, and the piping to operably connect the elements.

Mixing tank 212 can be any suitable receptacle for combining and temporarily storing solid and liquid materials. In the embodiment illustrated, tank 212 accepts wet solids stream 20 and liquid stream 41, which will be described below. Examples of suitable materials for tank 212 include steels, such as carbon steel and stainless steels.

A preferred material is 304 stainless steel. The volume of tank 212 is based on the material flow volumes and desired residence time in tank 212. A 30 gallon tank is a suitable size for some processes.

Pump 214, used to move material from tank 212, is positioned downstream of tank 212. Pump 214 is selected for its ability to move the material from tank 212, which includes solid material and liquid, to mechanical separator 216. Examples of suitable pumps include diaphragm pumps, centrifugal pumps, and pumps designed to pump a combination of liquid and solids. An example of a preferred pump 214 is a centrifugal pump available from Goulds Pumps of ITT Industries.

Mechanical separator 216 separates solid material from liquid. Examples of suitable mechanism separating equipment include Rotocel extractors, double screw extractors, baskets, rotary perforated belts, sliding rolls, and loop extractors; this equipment is well known for solid/liquid extraction processes. The specific equipment used will be dependent on the solvents used in the process and in the solvent ratios.

Preferred equipment for use in extraction system 200 is a stationary screen, described below.

The piping connecting tank 212, pump 214, and mechanical separator 216, for each extraction unit 210, is selected for its ability to move the solid-liquid material. An example of preferred piping is 1 inch carbon steel piping.

A preferred configuration for a screen mechanical separator 216 is illustrated in FIG. 3A as separator 116; that is, mechanical separator 216 can be the same as mechanical separator 116 from water extraction system 100.

Returning to FIG. 5, the illustrated process has three extraction units 210A, 210B, 210C. Unit 210A has mixing tank 212A, pump 214A, mechanical separator 216A, and the piping to operably connect the elements. Unit 210B has mixing tank 212B, pump 214B, mechanical separator 216B, and the piping to operably connect the elements. Unit 210C has mixing tank 212C, pump 214C, mechanical separator 216C, and the piping to operably connect the elements.

Wet solids stream 20 is fed into tank 212A where it is mixed with liquid stream 41 (described later). This mixture, as stream 21, is pumped via pump 214A to mechanical separator 216A, where it is split into liquid stream 230 and wet solids stream 44.

Wet solids stream 44 is fed into tank 212B where it is mixed with liquid stream 42 (described later). This mixture, as stream 22, is pumped via pump 214B to mechanical separator 216B, where it is split into liquid stream 41 and wet solids stream 45.

Wet solids stream 45 is fed into tank 212C where it is mixed with second solvent stream 70. This mixture, as stream 23, is pumped via pump 214C to mechanical separator 216C, where it is split into liquid stream 42 and wet solids stream 220.

Liquid stream 230, from unit 210A, is referred to as a "full miscella". Stream 41, from unit 210B, is referred to as a "⅔ miscella" and stream 42, from unit 210C, is referred to as a "⅓ miscella". Full miscella stream 230 has a lower second solvent concentration and a higher first solvent concentration than ⅔ miscella stream 41, which has a lower second solvent concentration and a higher first solvent concentration than ⅓ miscella stream 42.

Each of these streams 230, 41, 42 is reused in the process. Stream 41 is recycled and fed into tank 212A, and stream 42 is recycled and fed into tank 212B. Full miscella stream 230, composed of first solvent from stream 15 and second solvent from stream 70, is used in 'water-from-solvents' separation subprocess B. Wet solids stream 220, composed of solids and second solvent from stream 70, progresses to drying system 300.

Drying System 300

Wet solids stream 220, having solids and second solvent from stream 70, from solvent extraction system 200, is fed to drying system 300, where the solvent and any other volatile liquids or solvents are removed from the solids. Drying system 300 is the only unit in 'solvent-from-solids' separation subprocess A that uses thermal energy. Examples of suitable equipment for drying system 300 include a steam-jacketed tube dryer (such as a Schnecken tube dryer), steam-heated-screw tube dryer, a rotary dryer, a belt dryer, a down-draft desolventizer, or a DT; this equipment is well known for drying processes. A preferred drying system 300 includes a steam-jacketed tube style dryer.

The solvent is thermally removed from the solids at drying system 300, and dry solids are obtained as output stream 90. The second solvent removed exits drying system 300 as stream 80. Stream 80 may be further processed. In the process embodiment illustrated in FIG. 4, stream 80 is combined with miscella stream 230 and sent to 'water-from-solvents' separation subprocess B.

'Water-from-Solvents' Separation Subprocess B

Returning to FIG. 1, stream 30, composed of water from beer feed 10 and first solvent from stream 15, is conveyed to 'water-from-solvents' separation subprocess B and processed to separate the water from solvent.

However, to maximize the separation to provide desired output streams, subprocess B preferably utilizes a second solvent, provided to subprocess B as solvent stream 40.

Solvent of stream 40 is selected to have a lower heat of vaporization or enthalpy of vaporization than the components of stream 30, that is, the water from feed stream 10 and the solvent of stream 15. In a preferred method, the solvent of stream 40 is the same as the solvent of stream 70, from 'solvent-from-solids' separation subprocess A, described above. Preferably, solvent stream 40 is recycled from 'solvent-from-solids' separation subprocess B; specifically, solvent stream 40 is obtained from stream 80.

Stream 80 is combined with stream 230 and this combined stream 80/230 is fed as a single stream to subprocess B. Stream 40 is added as necessary to assure a proper concentration of the three major components, water, first solvent and second solvent.

Any known methods can be used to separate the water from the solvent. Examples of suitable liquid-liquid extraction or liquid-liquid separation methods include distillation, for example packed, York-Scheibel, Oldshue-Ruston, rotating disc, Karr or pulsed columns. Another suitable separation method is with a centrifugal contactor.

Figure 6:
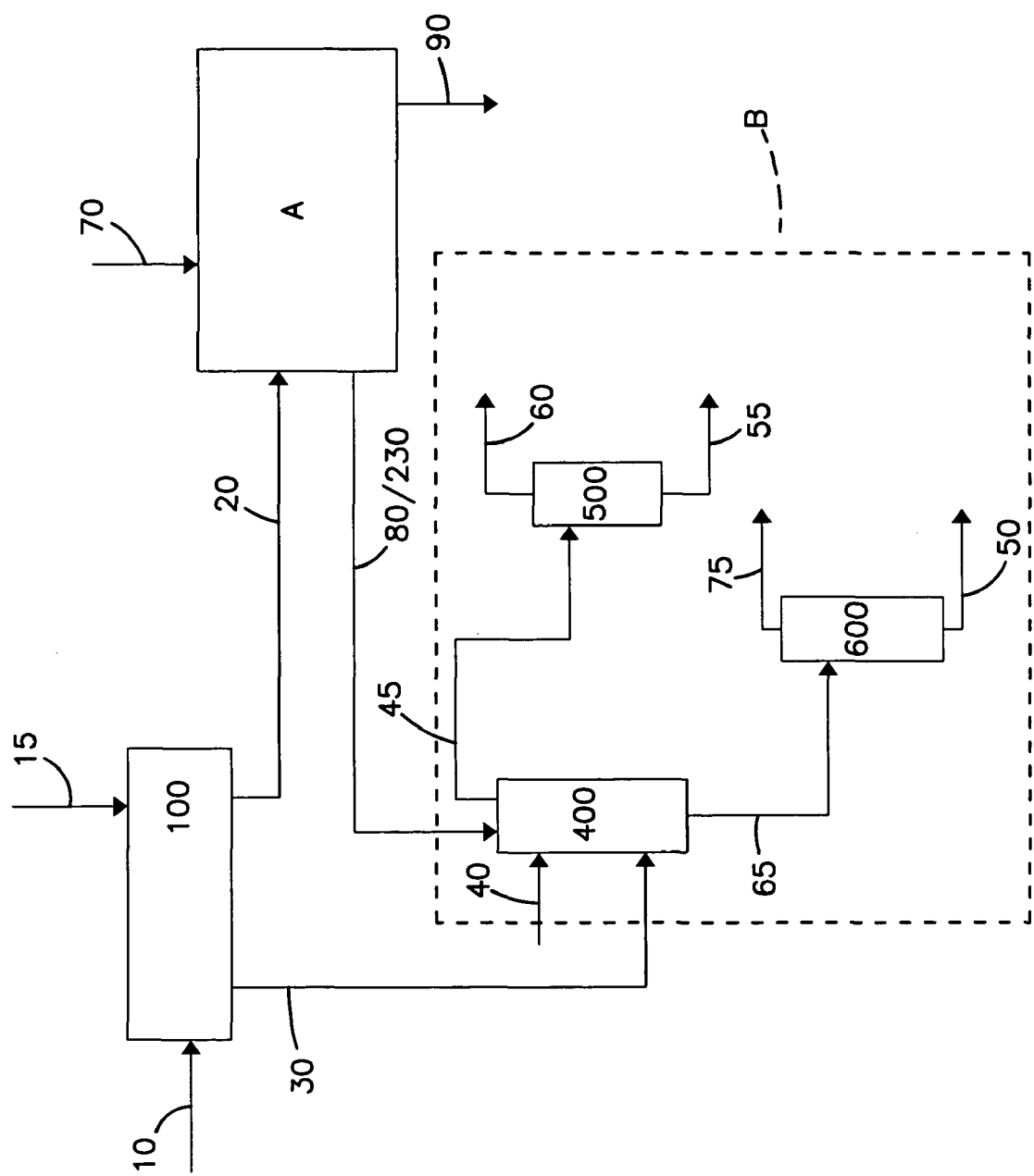
FIG. 6 is a schematic process diagram of a first embodiment of the 'water-from-solvents' separation subprocess according to the present invention.

One general configuration for 'water-from-solvents' separation process B is illustrated in FIG. 6. Subprocess B includes a liquid-liquid separation unit 400 and two distillation units 500, 600.

In this embodiment, liquid stream 30, which enters liquid-liquid process unit 400 at the bottom, has a density less than stream 80/230 which enters at the top of unit 400. Thus the components of stream 30 rise in unit 400 while components in stream 80/230 fall in the column. Exiting from unit 400 are top stream 45 from the top of unit 400 and a bottom stream 65 from the bottom of unit 400. The particular composition of streams 45, 65 will depend on the composition of streams 30 and 80/230. Stream 40 is a make-up stream to assure proper balance of water, first solvent and second solvent in unit 400.

There are components in each entering stream 30, 40 that are soluble in one another and some that are insoluble in each other. By choice, the solvent of stream 80/230 and water are typically not soluble in each other and form an upper and lower phase rich in one or the other. As the solvent may have a density greater or lesser than that of water, the water rich phase may be at the top or bottom. If the solvent of stream 80/230 is assumed to have a density of 1.3, and therefore denser than water, the solvent rich phase will exit out the bottom of the column 400 as stream 65 and the water-rich phase out the top as stream 45. Stream 45 tends to be a stream high in alcohol and water with other lesser water-soluble components, possibly with a small amount of the solvent of stream 80/230. Stream 65 is a stream high in solvent, with possibly small amounts of alcohol and other components.

Stream 45 is sent to process unit 500, an evaporation or distillation device, for further separation into streams 55 and 60. Stream 65 is sent to process unit 600, a different distillation or evaporation device, for further separation into streams 50 and 75.

In many processes, streams 50, 55, 60, 75 are sufficiently pure so that the material from these streams can be sold or otherwise used without the need for additional processing.

A Preferred Embodiment of the Process

Figure 7:
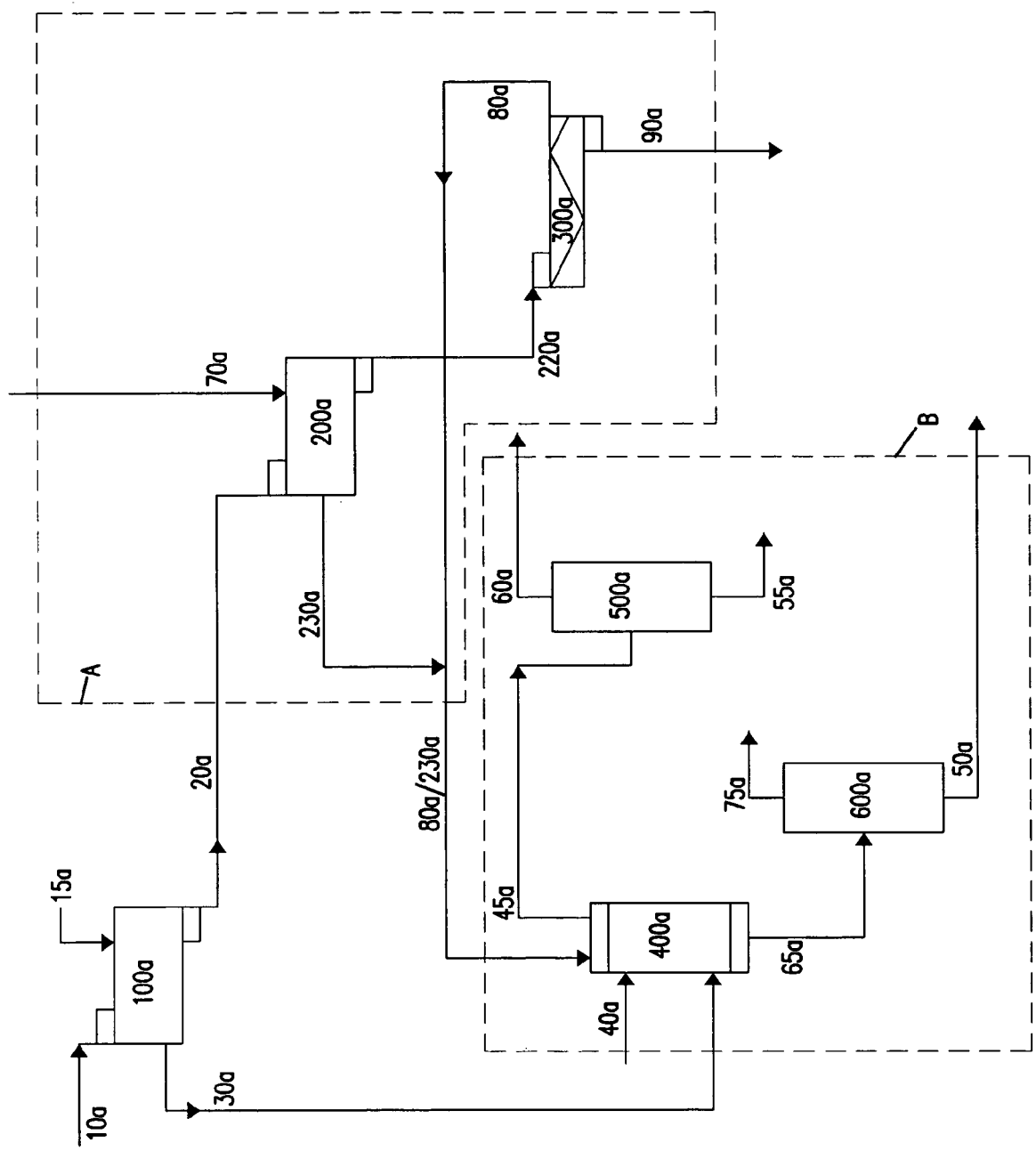
FIG. 7 is a schematic process diagram of a preferred process according to the present invention.

A preferred embodiment of the process is diagrammatically illustrated in FIG. 7. This process has an initial extraction process that removes the water from the solids followed by two subprocesses. The first subprocess removes the initial solvent from the solids and a second subprocess that separates and reclaims the water, solvent and other components. The description of this preferred process uses the same reference numerals used before for like streams and equipment, as appropriate, except that the reference numerals are followed by an "a".

In this embodiment of a preferred process, a beer stream 10a (composed of corn solids, water, ethanol, oils, glycerol and other minor components) is fed into a solid-liquid extraction system 100a. An alternative term for solid-liquid extraction system 100a is a water extractor or water extraction unit. Water extraction system 100a is designed to remove water from the feed stream 10a and replace the water with a solvent. Examples of suitable solids-liquid extraction equipment have been described previously as water extraction system 100, and a preferred system 100a includes three separators 116. The water-extraction system 100a operates in a counter-current fashion.

A first solvent, an extraction solvent, 15a is fed into water extraction system 100a where part of the solvent replaces the water from stream 10a. In this embodiment, the extraction solvent is ethanol. Ethanol has a lower heat of vaporization or enthalpy of vaporization than the water in feed stream 10a.

System 100a, the resulting output streams are wet solids stream 20a and liquid stream 30a. Solid stream 20a progresses to and is treated by 'solvent-from-solids' separation subprocess A, described below. Liquid stream 30a progresses to and is treated by 'water-from-solvents' separation subprocess B, also described below.

Subprocess A

Wet solids stream 20a from system 100a is pumped to solids-liquid extractor system 200a by piping. Examples of suitable equipment for system 200a have been provided previously as solids-liquid extractor system 200, and a preferred system 200a includes three separators 216. Typically solvent extraction system 200a operates in a counter-current arrangement.

Also entering solvent extraction system 200a is a second solvent, stream 70a. In this embodiment, the solvent is n-propyl bromide. n-propyl bromide has a lower heat of vaporization or enthalpy of vaporization than the water in feed stream 10a and the ethanol of stream 15a.

In solvent extraction system 200a, ethanol in stream 20a, particularly that in the interstitial spaces of the solids, is replaced with n-propyl bromide from stream 70a. The ethanol leaves system 200a leave as stream 230a and the solids, now wet with n-propyl bromide exit system 200a as stream 220a.

Stream 220a is fed to a dryer 300a where n-propyl bromide and any other remaining volatile liquids or solvents are removed from the solids. Dryer 300a is the only unit in subprocess A that uses thermal energy. Examples of suitable equipment for dryer 300a have been previously described in respect to dryer 300. Dry solids exit as output stream 90a. The thermally removed solvent exits dryer 300a as stream 80a, a vapor. Stream 80a is combined with liquid stream 230a. This combined stream 80a/230a and stream 30a is fed into liquid-liquid extraction unit 400a in 'water-from-solvents' separation subprocess B.

Subprocess B

Combined stream 30a is provided to the bottom of process unit 400a. A solvent stream 80a/230a enters at the top of unit 400a. In this embodiment, the solvent of stream 80a/230a is n-propyl bromide. Stream 30a has a density less than n-propyl bromide, which enters at the top of unit 400a. Thus the components of stream 80a/230a fall in the column while components in stream 30a rise in the column. Normal-propyl bromide, with a density of 1.3, will therefore exit out the bottom of the column as a solvent-rich stream 65a, and the water-rich phase will exit out the top as stream 45a.

Stream 45a is high in alcohol and water content with other lesser water-soluble components. There may be a small amount of n-propyl bromide in stream 45a.

Stream 45a is sent to process unit 500a, an evaporation or distillation device. Unit 500a separates the ethanol from the mixture of stream 45a; the ethanol, as a vapor and as an azeotrope of ethanol and water, leaves unit 500a as stream 60a. Stream 60a may either be condensed, used as is, or sent for further processing to remove other components. Stream 60a may also be conveyed, as a vapor, to other purification devices to provide a product ethanol that is 99.9+% pure.

Stream 55a from process unit 500a is mostly water with some water soluble components that did not vaporize in unit 500a. This liquid stream 55a may be used as is or further refined or purified.

Returning to unit 400a, stream 65a, the high organic bottom stream from unit 400a, is also sent to a distillation or evaporation device. The majority of stream 65a consists of n-propyl bromide and the remainder of stream 65a is composed of fat soluble components, such as corn oil. Stream 65a feeds process device 600a which has an exiting vapor stream 75a and a liquid stream 50a. Stream 75a is primarily n-propyl bromide. This vapor can be condensed and recycled (reused) in the solid-liquid extraction subprocess A, as stream 70a. The liquid stream 50a is primarily fats and oils; this stream may be used as is or may be further refined.

Alternate Embodiments of Process Using Sequential Solvents

Figure 8:
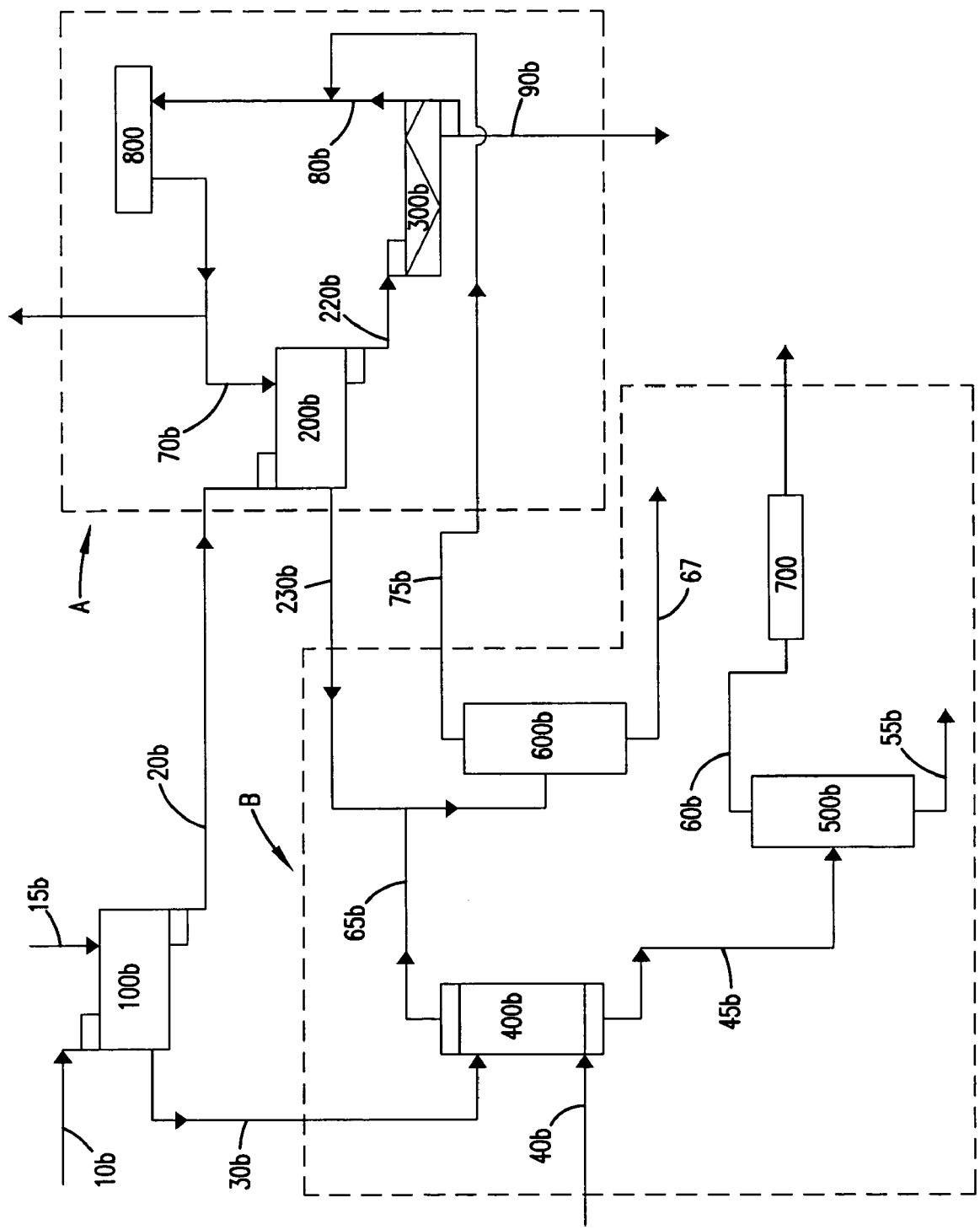
FIG. 8 is a schematic diagram of an alternate process according to the present invention.

A first alternate embodiment of the process is diagrammatically illustrated in FIG. 8. This process has an initial extraction process that removes the water from the solids followed by two subprocesses. The first subprocess removes the initial solvent from the solids and a second subprocess that separates and reclaims the water, solvent and other components. The description of this preferred process uses the same reference numerals used before for like streams and equipment, as appropriate, except that the reference numerals are followed by a "b".

In this embodiment, feed stream 10b is fed into a solid-liquid extraction system 100b where the solids of feed stream 10b are separated from the water. Examples of suitable solids-liquid extraction equipment have been described previously as water extraction system 100, and a preferred system 100b includes separators 116.

An extraction solvent stream 15b is fed into water extraction system 100b with feed stream 10b. In this embodiment, the extraction solvent is ethanol. Ethanol has a lower heat of vaporization or enthalpy of vaporization than the water in feed stream 10b. The resulting output streams from system 100b are wet solids stream 20b and liquid stream 30b. Solid stream 20b progresses to and is treated by 'solvent-from-solids' separation subprocess A, described below. Liquid stream 30b progresses to and is treated by 'water-from-solvents' separation subprocess B, also described below.

Subprocess A

From water extraction system 100b, solid stream 20b is conveyed to solid-liquid extraction system 200b where the solvent from stream 15b is removed from the solids and replaced with second solvent entering as stream 70b. In this embodiment, the solvent is ethyl ether, which has a lower heat of vaporization or enthalpy of vaporization that the water in feed stream 10b and the ethanol of stream 15b. The ethyl ether of stream 70b may be provided by an external source, but is preferably recycled from the solvent removed from the solids, and from overhead stream 75b from still 600b, as will be discussed below.

In solvent extraction system 200b, ethanol in stream 20b is replaced with ethyl ether from stream 70b. The ethanol leaves system 200b as stream 230b and the solids, now wet with ethyl ether, exit system 200b as stream 220b.

Stream 220b is fed to a dryer 300b where ethyl ether and any other remaining volatile liquids or solvents are removed from the solids. The thermally removed solvent exits dryer 300b as stream 80b, a vapor, and progresses to condenser 800. Depending on the volume of stream 80b, a portion of it may be removed as an ether side-stream. The remainder of stream 80b is returned to system 200b.

Stream 230b progresses to 'water-from-solvents' separation subprocess B.

Subprocess B

'Water-from-solvents' separation subprocess B treats liquid stream 30b from water extraction system 100b and stream 230b from subprocess A. Stream 30b is provided to the top of process unit 400b. Liquid-liquid extraction unit 400b is typically a tall column with four ports, one inlet at the top and one inlet at the bottom, and two outlets, one at the top and one at the bottom; streams from the two inlets run counter-current. A solvent stream 40b enters at the bottom of unit 400b. In this embodiment, the solvent of stream 40b is ethyl ether. Thus the components of stream 40b rise in the column while components in stream 30b fall in unit 400b, resulting in exiting aqueous bottom exit stream 45b, which has a lower concentration of ethanol than stream 30b did at the inlet, having transferred some ethanol to the ether stream. Also exiting is top exit stream 65b, mostly ether but which has a higher concentration of ethanol than stream 40b did at the inlet, having received some ethanol from stream 30b.

Bottom exit stream 45b is composed of the water, ethanol, and some other hydrocarbons from feed stream 10b, and a small amount of ethyl ether from stream 40b. Stream 45b is fed into a still 500b, where thermal energy is used to separate all volatile components from water and provide an overhead stream 60b and a bottoms stream 55b. Still 500b is one of only two process elements, in this embodiment of subprocess B, that utilizes thermal energy.

Overhead stream 60b includes ethanol and any trace amount of ether that may have been present in stream 45b. Bottom stream 55b includes water and any other heavy materials. A generally small amount of external heat or energy is needed to provide the separation, due to the different boiling points of water and solvents.

Overhead stream 60b progresses to a condenser 700, where ethanol vapors are condensed to liquid. The resulting liquid stream is fairly pure, typically at least 90% and preferably at least 95%. The ethanol can be collected and used for solvent stream 15b. Bottoms stream 55b is generally sufficiently pure water to allow disposal with a minimum of further purification.

Top exit stream 65b from liquid-liquid extraction unit 400b contains the majority of ether from unit 400b, a major amount of ethanol from stream 30b, and typically includes a small amount of water. Top exit stream 65b and stream 230b are fed into a still 600b, the second of the two process elements of subprocess B in this embodiment that utilizes thermal energy. Top exit stream 65b is separated by still 600b into an overhead stream 75b and a bottoms stream 67.

Overhead stream 75b includes the ether; typically this stream is fairly pure, typically at least 95% pure and preferably at least 98% pure. Overhead stream 75b is recycled into the process and combined with ether stream 80b, out from dryer 300b of subprocess A.

Bottom stream 67 includes the heavier ethanol; this stream is fairly pure, typically at least 90% pure and preferably at least 95% pure. Bottom stream 67, composed of fairly pure ethanol, can be treated in the same manner as stream 60b, either collected, returned to the process as solvent stream 15b, or further purified.

Figure 9:
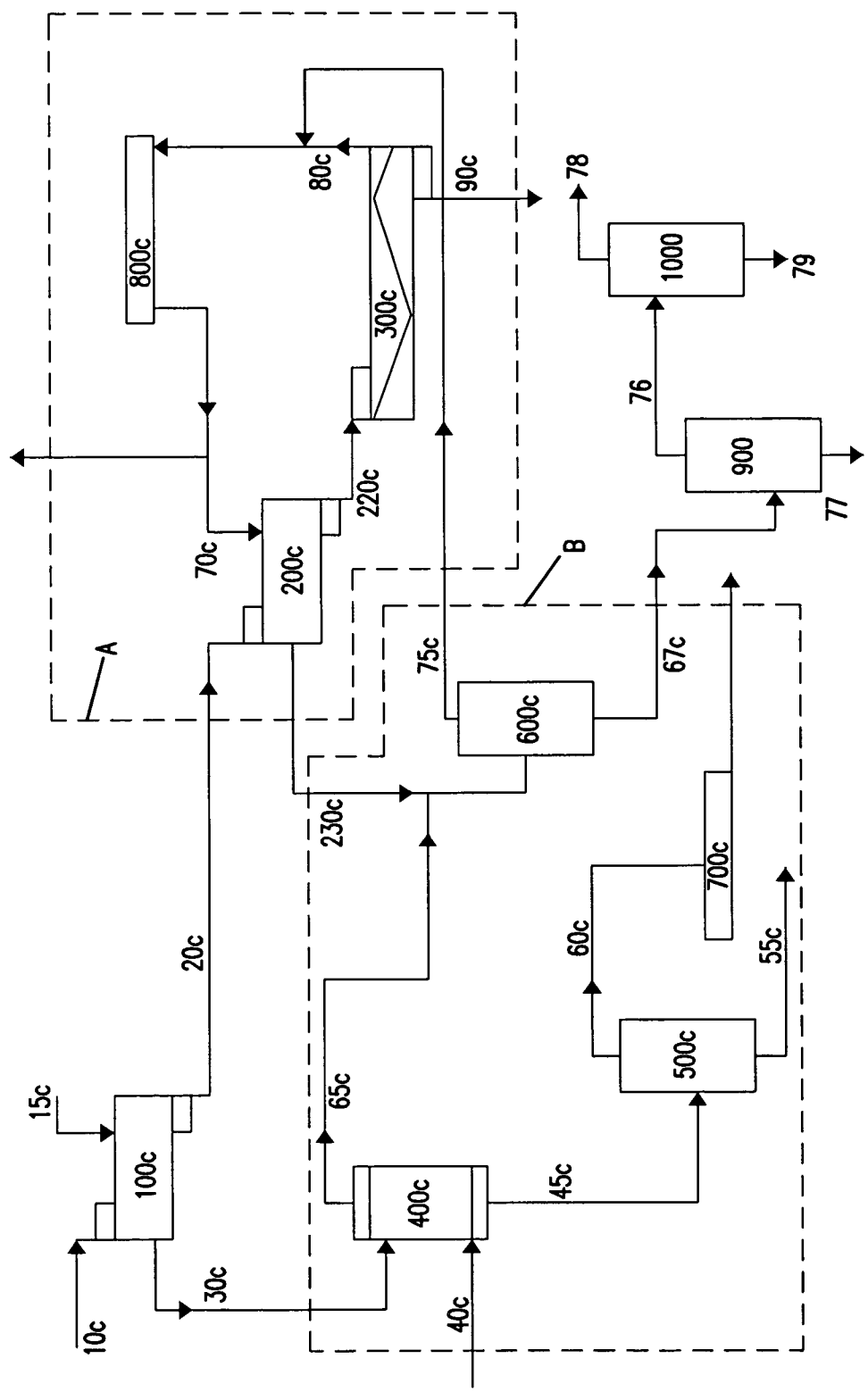
FIG. 9 is a schematic diagram of another alternate process according to the present invention.

A second alternate embodiment of the process using two sequentially applied solvents is diagrammatically illustrated in FIG. 9. This process has an initial extraction process that removes the water from the solids followed by two subprocesses. The first subprocess removes the initial solvent from the solids and a second subprocess that separates and reclaims the water, solvent and other components. The description of this preferred process uses the same reference numerals used before for like streams and equipment, as appropriate, except that the reference numerals are followed by a "c".

FIG. 9 shows a process similar to the process of FIG. 8, except this embodiment includes additional process equipment. Bottom stream 67c from unit 600c is sent to an evaporator unit 900, which is designed to boil off an azeotropic mixture of ethanol and water, to provide stream 76 and stream 77. Stream 76 contains a mixture of ethanol, water preferably and some small amounts of additional volatile material. Stream 76 progresses to system 1000, a series of molecular sieves. System 1000 takes the azeotropic mixture from evaporator unit 900 and provides ethanol, stream 78. Remaining water from the separation leaves system 1000 as stream 79.

The nonvolatilized portion of stream 75c exits unit 900 as stream 77, relatively clean water.

Figure 10:
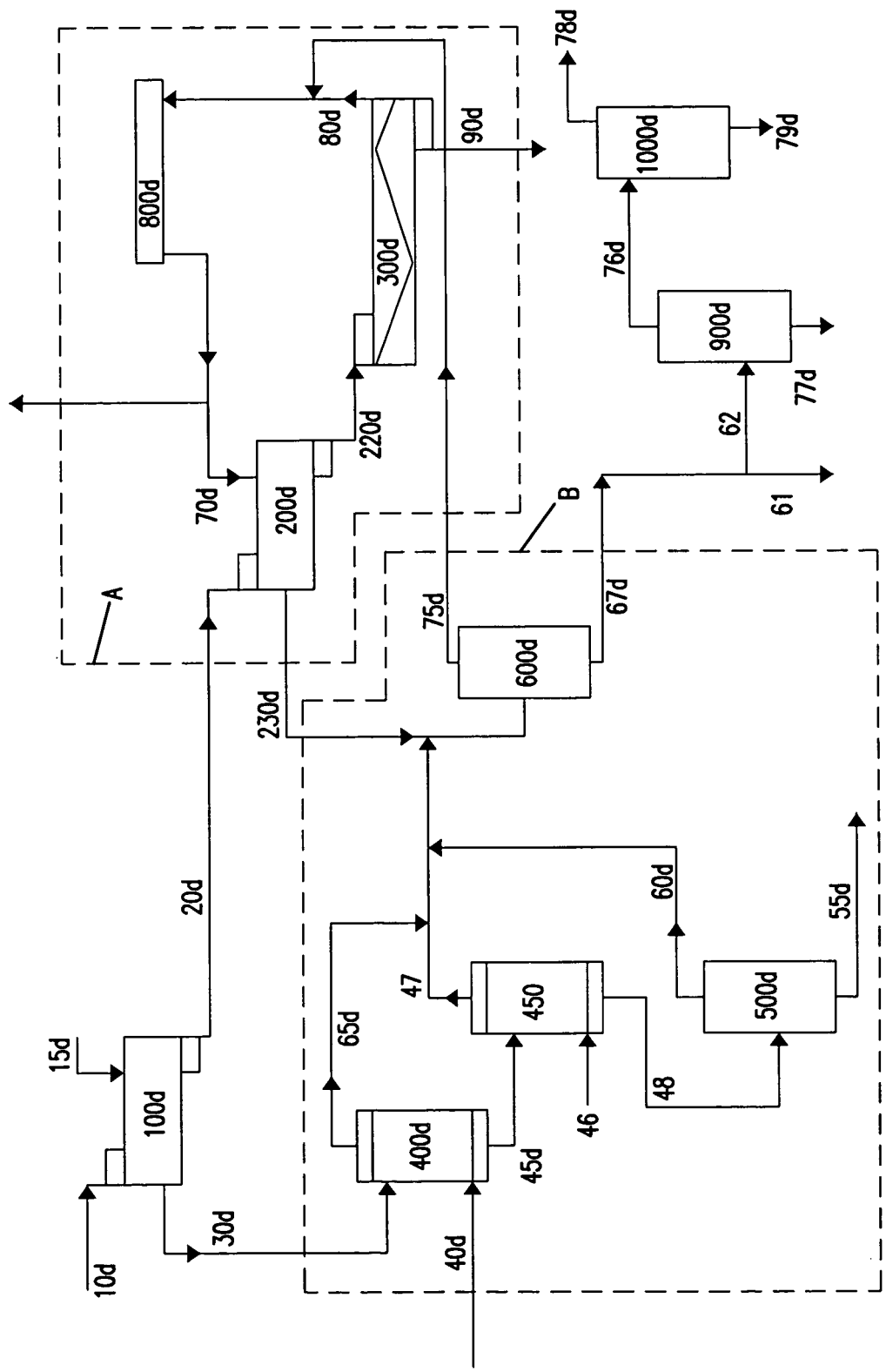
FIG. 10 is a schematic diagram of yet another alternate process according to the present invention.

A third alternate embodiment of the process using two sequential solvents is diagrammatically illustrated in FIG. 10. The description of this preferred process uses the same reference numerals used before for like streams and equipment, as appropriate, except that the reference numerals are followed by a "d".

FIG. 10 is another embodiment of the process and is similar to the process of FIG. 9. However, the process of FIG. 10 has an added liquid/liquid extractor unit 450. Unlike the embodiments of FIGS. 8 and 9, the aqueous (bottom) stream 45d, from unit 400d does not feed unit 500d directly, but instead is one of two feed streams to unit 450. Similar to unit 400d, unit 450 extracts ethanol from an aqueous feed stream using an ether, which is the other feed stream 46 provided to unit 450. The organic (top) phase stream from unit 450, stream 47 is combined with organic phase stream 65d from unit 400d. Additionally, vapor stream 60d from unit 500d is not sent to a condenser but instead is combined with streams 47 and 65d and the resulting stream is combined with stream 230d from system 200d. This combined stream is fed to unit 600d. Also in this embodiment, stream 67d is split into streams 61 and 62. Stream 62 carries the appropriate amount of ethanol to provide 200-proof ethanol and ethanol to regenerate the sieve beds of system 1000. Stream 61 is sent to a storage tank for reuse in the process.

Alternate embodiments, of any of the process described above, which utilize an initial extraction process that removes the water from the solids followed by two subprocesses, are within the scope of this invention.

The various processes described above used two solvents sequentially, or step-wise, to remove water from solids; specifically, the first solvent replaced the water, and then the second solvent replaced the first solvent. Although the description above labeled solvents as "first solvents" and "second solvents", and the like, it should be recognized that these groupings are not limiting. In some designs, for example, a solvent listed in the "second solvent" group may be used as a first solvent; similarly, a solvent listed in the "first solvent" group may be used as a second solvent. The only basis is that the second solvent has a heat of vaporization, enthalpy of vaporization, or other such physical property, that is less than that of the first solvent. If a third solvent is used, the third solvent would have a heat of vaporization, enthalpy of vaporization, or other such physical property, that is less than that of the second solvent.

General Operating Conditions

The following generally operating conditions are suitable for the process according to the invention, when operated in a typical pilot plant scale.

| Stream | Flowrate |
|---|---|
| Feed stream 10 | 100-120 lbs/min (15-25 gal/min) |
| First solvent stream 15 | Based on stream 10 |
| Solids stream 20 | Based on streams 10 and 15, and on stream 70 |
| Second solvent stream 70 | Based on stream 20 |

$$\frac{\text{First solvent stream 15 (lb/min)}}{\text{Feed Stream 10 (lb/min)}} = \text{about } 1.0 \text{ to } 0.3 \quad \text{(I)}$$

$$\frac{\text{Second solvent stream 70 (lb/min)}}{\text{Solids stream 20 (lb/min)}} = \text{about } 1.1 \text{ to } 0.3 \quad \text{(II)}$$

Process temperature = 85-90° F.
Process pressure = atomspheric

The flow rates within the system that are useful in accordance with the invention are indicated above. Generally, feed stream 10 has a flow rate of 100 to 120 lbs/min. The flow rate of first solvent stream 15 is set in accordance with equation (I). The flow rates of second solvent stream 70 generally range from 10-20 lbs/min, but may also be adjusted relative to stream 20 through equation (II). The flow rates of the various streams into and out from subprocess B are generally governed by stream flow rates in system 100 and subprocess A.

Exemplary Process Conditions

Figure 11:
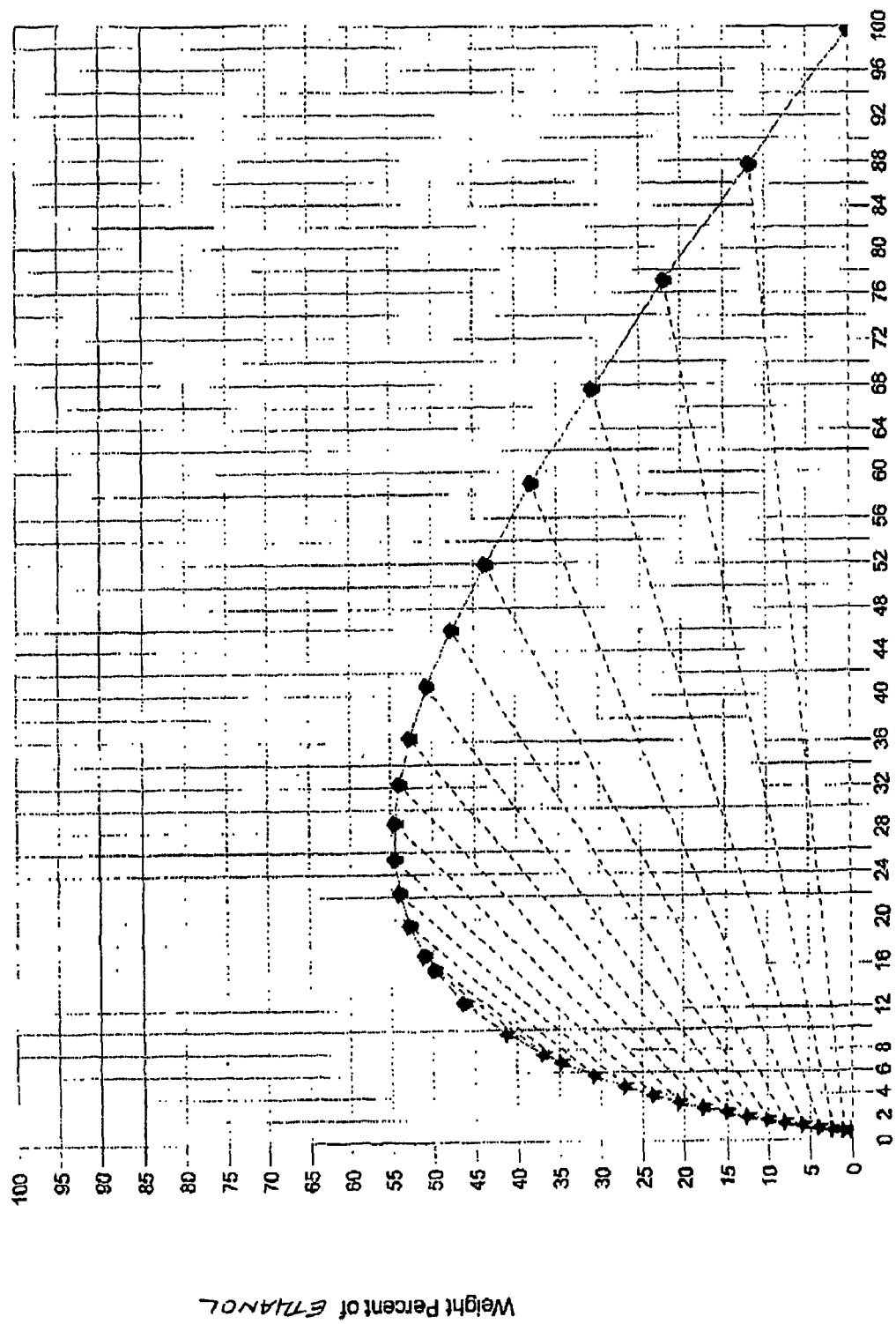
FIG. 11 is a binary diagram for a preferred three-solvent system according to the present invention.

Provided below are exemplary stream components and proposed material flow rates for a commercial size, modeled process, described in reference to FIG. 7, which used n-propyl bromide as the subsequent second solvent. A binary diagram, for n-propyl bromide/ethanol/water is provided as FIG. 11. It was found that using n-propyl bromide, for a system desirous of separating water and ethanol, was beneficial in that there was a tendency for the system to equilbriate at a low water percentage.

|  | Solids Feed Stream 10a | Ethanol Feed Stream 15a |
|---|---|---|
| Flow Rate | 4000 lb/min | 1090 lb/min |
| Fiber | 12 wt-% | 0 |
| Oil | Trace | 0 |
| Water | 73 wt-% | 7.4 wt-% |
| Glycerol | Trace | 0 |
| Acetic Acid | Trace | 0 |
| Ethanol | 13 wt-% | 92.6 wt-% |

In unit 100a, feed stream 10a (usually at a temperature of about 85-90° F.) and first solvent stream 15a would be sent through a series of six screen extractor units 116 (see FIG. 2, where a series of three screen extractor units 116A, 116B, 116C are illustrated). The resulting streams from the six extractors would be:

|  | Flow Rate | Water | Ethanol | Fiber |
|---|---|---|---|---|
| Extractor #1 solids stream | 3543 lb/min | 70 wt-% | 17 wt-% | 11 wt-% |
| Extractor #2 solids stream | 3216 lb/min | 65 wt-% | 21 wt-% | 12 wt-% |
| Extractor #3 solids stream | 2889 lb/min | 58 wt-% | 27 wt-% | 14 wt-% |
| Extractor #4 solids stream | 2562 lb/min | 50 wt-% | 33 wt-% | 15 wt-% |
| Extractor #5 solids stream | 2234 lb/min | 40 wt-% | 42 wt-% | 17 wt-% |
| Extractor #6 solids stream | 1906 lb/min | 26 wt-% | 53 wt-% | 20 wt-% |

|  | Wet Solids Stream 20a | Aqueous Stream 30a |
|---|---|---|
| Flow Rate | 1906 lb/min | 3251 lb/min |
| Fiber | 20 wt-% | 3 wt-% |
| Oil | Trace | 0 |
| Water | 26 wt-% | 78 wt-% |
| Glycerol | Trace | 0 |
| Acetic Acid | Trace | 0 |
| Ethanol | 53 wt-% | 19 wt-% |

Wet solids stream 20a would progress to unit 200a, where it and second solvent stream 70a would be sent through a series of six screen extractor units 216 (see FIG. 5, where a series of three screen extractor units 216A, 216B, 216C are illustrated). The resulting streams from the six extractors would be:

|  | Flow Rate | Water | Ethanol | n-PB | Fiber |
|---|---|---|---|---|---|
| Extractor #1 solids stream | 1799 lb/min | 23 wt-% | 49 wt-% | 6 wt-% | 22 wt-% |
| Extractor #2 solids stream | 1691 lb/min | 21 wt-% | 44 wt-% | 12 wt-% | 23 wt-% |
| Extractor #3 solids stream | 1583 lb/min | 18 wt-% | 38 wt-% | 20 wt-% | 25 wt-% |
| Extractor #4 solids | 1475 lb/min | 14 wt-% | 31 wt-% | 29 wt-% | 26 wt-% |

-continued

| | Flow Rate | Water | Ethanol | n-PB | Fiber |
|---|---|---|---|---|---|
| Extractor #5 solids stream | 1368 lb/min | 10 wt-% | 23 wt-% | 38 wt-% | 28 wt-% |
| Extractor #6 solids stream | 1260 lb/min | 6 wt-% | 13 wt-% | 50 wt-% | 31 wt-% |

The miscella stream from Extractor #1 would correspond to stream 230a of FIG. 7. The components of stream 230a are provided below.

The solid stream obtained from Extractor #6 would correspond to stream 220a of FIG. 7. Stream 220a, fed into dryer 300a, provides solids stream 90a and vapor stream 80a. Solids stream 90a would be a flow of 389 lb/min of 100% solids

| | Vapor stream 80a | Miscella stream 230a | Combined Stream 80a/230a |
|---|---|---|---|
| Flow Rate | 871 lb/min | 1410 lb/min | 2281 lb/min |
| Water | 8 wt-% | 30 wt-% | 21 wt-% |
| Ethanol | 19 wt-% | 62 wt-% | 46 wt-% |
| n-PB | 72 wt-% | 7 wt-% | 32 wt-% |

Combined stream 80a/230a would be fed into the top of separation column 400a and aqueous stream 30a would be fed into the bottom of column 400a and streams 45a and 65a would exit. In this example, no additional solvent, as stream 40a, was added.

| | Top Organic Stream 45a | Aqueous Bottom Stream 65a |
|---|---|---|
| Flow Rate | 655 lb/min | 4877 lb/min |
| Water | 1 wt-% | 61 wt-% |
| Ethanol | 2 wt-% | 34 wt-% |
| n-PB | 93 wt-% | 3 wt-% |
| Oils | 4 wt-% | 0 wt-% |
| Fiber/solids | 0 wt-% | 2 wt-% |

Stream 45a would be fed to still 500a and the exiting streams 60a, 55a would have the compositions listed below. In this example, a steam sparge stream, at 35 lb/min, was added to carry or otherwise facilitate transporting the solvents to the top of the still. Stream 65a would be fed to still 600a and the exiting streams 75a, 50a would have the compositions listed below. In this example, heat exchangers would be used for flashing steam 65a prior to entering still 600a; this would decrease the entering mass flow rate to about 4700 lb/min.

| | Vapor Stream 60a | Oil Recovery Stream 55a | Ethanol Recovery Stream 75a | Water Stream 50a |
|---|---|---|---|---|
| Flow Rate | 665 lb/min | 25 lb/min | 1706 lb/min | 3003 lb/min |
| Water | 6 wt-% | 0.6 wt-% | 6 wt-% | 95 wt-% |
| Ethanol | 2 wt-% | 0 wt-% | 92 wt-% | 0 wt-% |
| n-PB | 92 wt-% | 0 wt-% | 2 wt-% | 0 wt-% |
| Oils/glycerine | 0 wt-% | 99.3 wt-% | 0 wt-% | 2 wt-% |
| Fiber/solids | 0 wt-% | 0 wt-% | 0 wt-% | 3 wt-% |

Additional Exemplary Process Conditions

Provided below are exemplary stream components and proposed material flow rates for a modeled process described in reference to FIG. 10, which used ether as the second solvent.

| | Solids Feed Stream 10d | | Ethanol Feed Stream 15d | |
|---|---|---|---|---|
| Component | wt-% | lb/min | wt-% | lb/min |
| Fiber | 12.2 | 398.2 | 0 | 0 |
| Oil | 0.6 | 19.6 | 0 | 0 |
| Water | 69.9 | 2281.5 | 4.5 | 88.1 |
| Glycerol | 1.2 | 39.2 | 0 | 0 |
| Acetic Acid | 0.1 | 3.3 | 0 | 0 |
| Ethanol | 16.0 | 522.2 | 82.8 | 1621.6 |
| Ether | 0 | 0 | 12.7 | 248.7 |
| Total | 100 | 3264 | 100 | 1958.4 |

| | Wet Solids Stream 20d | | Aqueous Stream 30d | |
|---|---|---|---|---|
| Component | wt-% | lb/min | wt-% | lb/min |
| Fiber | 44.1 | 394.2 | 0.1 | 4.0 |
| Oil | 1.1 | 9.8 | 0.2 | 9.8 |
| Water | 10.6 | 94.8 | 52.6 | 2274.9 |
| Glycerol | 2.2 | 19.6 | 0.5 | 19.6 |
| Acetic Acid | 0 | 0 | 0.1 | 3.2 |
| Ethanol | 36.5 | 326.4 | 42.0 | 1817.4 |
| Ether | 5.6 | 50.1 | 4.6 | 198.7 |
| Total | 100 | 894.9 | 100 | 4327.5 |

| | Ether Feed Stream 40d | | Ether Feed Stream 70d | |
|---|---|---|---|---|
| Component | wt-% | lb/min | wt-% | lb/min |
| Fiber | 0 | 0 | 0 | 0 |
| Oil | 0 | 0 | 0 | 0 |
| Water | 0 | 0 | 0 | 0 |
| Glycerol | 0 | 0 | 0 | 0 |
| Acetic Acid | 0 | 0 | 0 | 0 |
| Ethanol | 3.0 | 120.5 | 3.0 | 26.8 |
| Ether | 97.0 | 3894.7 | 97.0 | 868.1 |
| Total | 100 | 4015.2 | 100 | 894.9 |

| | Wet Solids Stream 220d | | Liquid Stream 230d | |
|---|---|---|---|---|
| Component | wt-% | lb/min | wt-% | lb/min |
| Fiber | 46.9 | 390.3 | 0.4 | 3.9 |
| Oil | 0.0 | 0.2 | 1.0 | 9.6 |
| Water | 5.7 | 47.4 | 4.9 | 47.4 |
| Glycerol | 0.0 | 0.4 | 2.0 | 19.2 |
| Acetic Acid | 0.0 | 0.0 | 0.0 | 0.0 |
| Ethanol | 0.4 | 3.3 | 36.5 | 350.0 |
| Ether | 46.9 | 390.3 | 55.1 | 527.8 |
| Total | 100 | 831.8 | 100 | 958.0 |

| | Dried Solids Stream 90d | | Ether Solvent Stream 80d | |
|---|---|---|---|---|
| Component | wt-% | lb/min | wt-% | lb/min |
| Fiber | 89.0 | 390.3 | 0 | 0 |
| Oil | 0 | 0.2 | 0 | 0 |
| Water | 10.8 | 47.4 | 0 | 0 |
| Glycerol | 0.1 | 0.4 | 0 | 0 |
| Acetic Acid | 0 | 0 | 0 | 0 |
| Ethanol | 0 | 0 | 0.8 | 3.3 |

-continued

| | | | | |
|---|---|---|---|---|
| Ether | 0 | 0.4 | 99.2 | 389.9 |
| Total | 100 | 438.7 | 100 | 393.2 |

| | Bottoms Stream 45d | | Top Stream 65d | |
|---|---|---|---|---|
| Component | wt-% | lb/min | wt-% | lb/min |
| Fiber | 0 | 0 | 0.1 | 4.0 |
| Oil | 0 | 0 | 0.2 | 9.8 |
| Water | 79.5 | 2274.9 | 0 | 0 |
| Glycerol | 0.7 | 19.6 | 0 | 0 |
| Acetic Acid | 0.1 | 3.2 | 0 | 0 |
| Ethanol | 18.4 | 527.0 | 25.7 | 1410.8 |
| Ether | 1.2 | 35.1 | 74.0 | 4058.3 |
| Total | 100 | 2859.8 | 100 | 5482.9 |

| | Ethanol Stream 60d | | Water Stream 55d | |
|---|---|---|---|---|
| Component | wt-% | lb/min | wt-% | lb/min |
| Fiber | 0 | 0 | 0 | 0 |
| Oil | 0 | 0 | 0 | 0 |
| Water | 5.0 | 27.7 | 99.0 | 2247.1 |
| Glycerol | 0 | 0 | 0.9 | 19.6 |
| Acetic Acid | 0 | 0 | 0.1 | 3.2 |
| Ethanol | 95.0 | 527.0 | 0 | 0 |
| Ether | 0.0 | 0.0 | 0 | 0 |
| Total | 100 | 554.8 | 100 | 2270.0 |

| | Ether Product Stream 75d | | Ethanol Stream 67d | |
|---|---|---|---|---|
| Component | wt-% | lb/min | wt-% | lb/min |
| Fiber | 0 | 0 | 0.4 | 7.9 |
| Oil | 0 | 0 | 1.1 | 19.4 |
| Water | 0.1 | 2.4 | 2.5 | 40.0 |
| Glycerol | 0 | 0 | 1.1 | 19.2 |
| Acetic Acid | 0 | 0 | 0 | 0 |
| Ethanol | 1.0 | 46.3 | 94.9 | 1714.5 |
| Ether | 99.0 | 4585.7 | 0 | 0.5 |
| Total | 100 | 4634.5 | 100 | 1806.4 |

Only three pieces of the process equipment from the system depicted in and described with reference to FIG. 10 use thermal energy. Dryer 1300, which is a Schnecken tube-type dryer, uses an exemplary 77.3 lb/min of steam, still 1700 uses an exemplary 6532 lb/min of steam, and water separator 1500 uses an exemplary 199.5 lb/min of steam.

The above description has been, in most part, directed to processes where the two solvents are applied sequentially to the solids; that is, the solids are contacted with a first solvent and then with a second solvent. It is understood that, in accordance with the present invention, the two, or more, solvents can be simultaneously applied to the solids; for example, multiple solvents can be mixed together prior to contacting the solids.

The solvents for concurrent or simultaneous application to the solids can be similar to those discussed above. The first solvent is preferably soluble in water but does not form an azeotropic mixture with water. The second solvent is preferably soluble with the first solvent but insoluble with water. The second solvent may, however, be miscible with the first solvent, and/or with water. Additionally, the first solvent has a lower heat of vaporization and boiling point than water, and the second solvent has a lower heat of vaporization and boiling point than the first solvent. Generally, the same solvents can be used for a mixed on concurrent system as for a sequential or stepped system.

Examples of suitable solvents, that can be mixed, include alcohols (such as ethanol, methanol, isopropyl alcohol, and gasohol), ketones (such as acetone, methyl ethyl ketone (MEK), methyl isobutyl ketone (MIBK)), hydrocarbons, and any mixtures thereof. Examples of suitable hydrocarbons include ethers, (such as ethyl ether, MTBE (methyl tert-butyl ether), ETBE (ethyl tert-butyl ether), fluorinated ethers, and other low molecular weight ethers), halogenated hydrocarbons (e.g., n-propyl bromide or 1-bromopropane), straight chain low molecular hydrocarbons (such as hexane, pentane), and low molecular weight aromatic hydrocarbons (such as toluene, benzenes, xylenes), and any mixtures thereof.

The ratio of the solvents is selected based on the solvents, the material present in the solids (e.g., ethanol and water), and other parameters. Suitable ratios are 1/99 to 99/1, 10/90 to 90/10, 25/75 to 75/25, 30/70 and 70/30, and another ratio; as stated, the ratio is selected based on the solvents and the desired resulting properties, including separation effectiveness, cost of solvents, cost of separation of solvents or separation of solvents from solids, toxicity of solvents, etc. For example, for removal of water and ethanol from solids, ethanol and n-PB is one example of a preferred solvent combination; ethanol and hexane is another example. Examples of suitable solvent mixtures include: 84/16, 75/25, 67/33 and 50/50 weight ratios of n-PB/ethanol; 84/16 is the azeotropic level. Based on numerous properties, including effectiveness of extraction, easy of separation, and cost, ratios of 75/25 and 67/33 are preferred. Other suitable examples of solvent mixtures include 79/21 hexane/ethanol, with is the azeotropic level.

The combined solvents work in generally the same manner as sequential solvents. Using an example of ethanol and n-PB on solids wet with water and ethanol, the ethanol solvent combines with the water in the interstitial spaces of the solids, for ethanol has a preference for water over n-PB (at least partially due to ethanol being soluble in water, and ethanol and n-PB not being soluble in one another). The n-PB replaces the ethanol in those spaces and drags the ethanol and water out of those spaces. The used solvent stream (i.e., the n-PB, ethanol, water, with any other ingredients) can then be removed from the solids by liquid-solid separation techniques, including filtering, decanting, and the like. In preferred systems, the used solid stream phase separates, with the n-PB separating from the ethanol and water. Small amounts of solids may be entrained in either solvent, or present as a layer on either side or, or between, the solvents. Liquid-liquid extraction, including distillation, could be done on the used solvent stream to separate the solvents. Any residual solvent (e.g., n-PB and/or ethanol) can be removed from the solids, for example, by heating.

This discussion has been a brief summary of using multiple combined solvents to remove water from solids. Alternate embodiments are within the scope of this invention. The process described above used two solvents concurrently, or mixed, to remove water from solids; specifically, the first solvent replaced the water, and then the second solvent replaced the first solvent, although in a single action. Although the description above labeled solvents as "first solvents" and "second solvents", it should be recognized that these groupings are not limiting. The only basis is that the second solvent has a heat of vaporization, enthalpy of vaporization, or other such physical property, that is less than that of the first solvent. If a third solvent is used, the third solvent would have a heat of vaporization, enthalpy of vaporization, or other such physical property, that is less than that of the second solvent.

The above specifications provide a complete description of the process, equipment, and compositions of the invention. Since many embodiments of the invention can be made without departing from the spirit and scope of the invention, the invention resides in the claims hereinafter appended.

I claim:

1. A process for drying solids initially wet with water, the process comprising:
    (a) contacting a feed stream from a fermentation process with a first solvent and a second solvent, the feed stream comprising solids having interstitial spaces therebetween and water present in the interstitial spaces and water absorbed by the solids, the first solvent having a heat of vaporization lower than the heat of vaporization of water and being soluble with water, and the second solvent having a heat of vaporization lower than the heat of vaporization of the first solvent and being miscible with the first solvent;
    (b) displacing the water present in the interstitial spaces with the first solvent to provide solids having the first solvent in the interstitial spaces; and
    (c) displacing the first solvent present in the interstitial spaces with the second solvent to provide solids having the second solvent in the interstitial spaces.

2. The process according to claim 1, further comprising the step of:
    (e) removing the second solvent from the interstitial spaces of the solids by the application of heat.

3. The process according to claim 1, wherein contacting a feed stream with a first solvent comprises:
    (a) contacting the feed stream with a first solvent that is an alcohol.

4. The process according to claim 3, wherein contacting a feed stream with a first solvent that is an alcohol comprises:
    (a) contacting the feed stream with a first solvent that is ethanol.

5. The process according to claim 3, wherein the contacting the feed stream with a second solvent comprises:
    (a) contacting the feed stream with a second solvent that is a halogenated hydrocarbon.

6. The process according to claim 5, wherein contacting the feed stream with a second solvent comprises:
    (a) contacting the feed stream with a second solvent that is n-propyl bromide.

7. The process according to claim 1, wherein contacting a feed stream with a first solvent and a second solvent comprises:
    (a) contacting the feed stream with the first solvent and then contacting the feed stream with the second solvent.

8. The process according to claim 7, wherein:
    (a) contacting a feed stream with a first solvent comprises contacting a feed stream with an alcohol;
    (b) contacting the feed stream with a second solvent comprises contacting the feed stream with n-propyl bromide; and the process further comprises:
    (c) obtaining a product that is at least 95% pure n-propyl bromide; and
    (d) obtaining an alcohol product that is at least 90% pure alcohol.

9. The process according to claim 8, wherein:
    (a) contacting a feed stream with an alcohol comprises contacting with ethanol; and
    (b) obtaining an alcohol product that is at least 90% pure alcohol comprises obtaining an alcohol product that is at least 95% pure ethanol.

10. The process according to claim 1, wherein contacting a feed stream with a first solvent and a second solvent comprises:
    (a) contacting the feed stream with the first solvent combined with the second solvent.

11. The process according to claim 10, wherein:
    (a) contacting a feed stream with a first solvent and a second solvent comprises combining a feed stream with an alcohol and with n-propyl bromide; and the process further comprises:
    (b) obtaining a product that is at least 95% pure n-propyl bromide; and
    (c) obtaining an alcohol product that is at least 90% pure alcohol.

12. The process according to claim 11, wherein:
    (a) combining a feed stream with an alcohol comprises combining with ethanol; and
    (b) obtaining an alcohol product that is at least 90% pure alcohol comprises obtaining an alcohol product that is at least 95% pure ethanol.

* * * * *